(12) United States Patent
Wu

(10) Patent No.: US 10,609,181 B2
(45) Date of Patent: Mar. 31, 2020

(54) METHOD AND APPARATUS FOR CONTROLLING SERVICE CHAIN OF SERVICE FLOW

(71) Applicant: HUAWEI TECHNOLOGIES CO., LTD., Shenzhen, Guangdong (CN)

(72) Inventor: Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 627 days.

(21) Appl. No.: 15/263,823

(22) Filed: Sep. 13, 2016

(65) Prior Publication Data

US 2016/0381175 A1 Dec. 29, 2016

Related U.S. Application Data

(63) Continuation of application No. PCT/CN2014/073472, filed on Mar. 14, 2014.

(51) Int. Cl.
*G06F 15/173* (2006.01)
*H04L 29/08* (2006.01)
(Continued)

(52) U.S. Cl.
CPC ........ *H04L 67/322* (2013.01); *H04L 12/1407* (2013.01); *H04L 12/6418* (2013.01);
(Continued)

(58) Field of Classification Search
CPC ............. H04L 47/2441; H04L 12/1407; H04L 45/306
See application file for complete search history.

(56) References Cited

U.S. PATENT DOCUMENTS 9,258,742 B1 * 2/2016 Pianigiani ............. H04L 67/327
2005/0055599 A1 3/2005 Bravo et al.
(Continued)

FOREIGN PATENT DOCUMENTS

CN 101207566 6/2008
CN 101296169 10/2008
(Continued)

OTHER PUBLICATIONS

Office Action, dated Dec. 12, 2017, in Russian Application No. 2016140245/08 (13 pp.).
(Continued)

*Primary Examiner* — Oleg Survillo
(74) *Attorney, Agent, or Firm* — Slater Matsil, LLP

(57) ABSTRACT

Embodiments of the present invention provide a method and apparatus for controlling a service chain of a service flow. The method includes: receiving a service processing customization request message sent by a content provider server/service provider server; generating, according to a service processing customization condition carried in the service processing customization request message, service chain information of a service flow corresponding to the content provider server/service provider server; and constructing, based on the service chain information, service chain control information corresponding to a service chain, so that a controller acquires the service chain control information and sends flow forwarding policy information corresponding to the service chain to a switch based on the service chain control information, so that the switch processes, according to the flow forwarding policy information, a received service flow.

29 Claims, 9 Drawing Sheets

(51) Int. Cl.

| | | |
|---|---|---|
| *H04L 12/64* | (2006.01) | |
| *H04L 12/715* | (2013.01) | |
| *H04L 12/725* | (2013.01) | |
| *H04L 12/14* | (2006.01) | |
| *H04L 29/06* | (2006.01) | |
| *H04L 12/851* | (2013.01) | |

(52) U.S. Cl.
CPC ............ *H04L 45/306* (2013.01); *H04L 45/64* (2013.01); *H04L 69/22* (2013.01); *H04L 47/2441* (2013.01)

(56) References Cited

U.S. PATENT DOCUMENTS

| | | | |
|---|---|---|---|
| 2005/0201597 A1 | 9/2005 | Wendt et al. | |
| 2005/0289244 A1 | 12/2005 | Sahu et al. | |
| 2007/0115861 A1 | 5/2007 | Zhang et al. | |
| 2009/0037713 A1 | 2/2009 | Khalid et al. | |
| 2011/0251936 A1 | 10/2011 | Zhang et al. | |
| 2012/0011020 A1* | 1/2012 | Saedifaez | G06Q 30/0621 705/26.5 |
| 2013/0272305 A1* | 10/2013 | Lefebvre | H04L 47/24 370/392 |
| 2014/0198728 A1* | 7/2014 | Zhou | H04L 41/0893 370/328 |
| 2015/0103827 A1* | 4/2015 | Quinn | H04L 45/74 370/392 |
| 2015/0263901 A1* | 9/2015 | Kumar | H04L 41/08 370/254 |

FOREIGN PATENT DOCUMENTS

| | | |
|---|---|---|
| EA | 200400950 | 2/2005 |
| EA | 200400950 A1 | 2/2005 |
| RU | 200400950 | 2/2005 |
| RU | 2 302 656 C2 | 7/2007 |
| RU | 2 368 084 C2 | 9/2009 |
| WO | 2005/109748 A1 | 11/2005 |
| WO | WO2007/082587 | 7/2007 |

OTHER PUBLICATIONS

Search Report, dated Dec. 11, 2017, in Russian Application No. 2016140245/08 (4 pp.).
International Search Report, dated Dec. 17, 2014, in International Application No. PCT/CN2014/073472 (12 pp.).
Extended European Search Report, dated Feb. 2, 2017, in European Application No. 14885603.2 (13 pp.).
Quinn, P. et al., *Service Function Chaining (SFC) Architecture*, Network Working Group, Cisco Systems, Inc., Jan. 28, 2014, XP15096320, pp. 1-21.
Quinn, P. et al., *Network Service Header*, Network Working Group, Cisco Systems, Inc., Feb. 14, 2014, pp. 1-21.
*Dynamic Service Chaining*, Jan. 25, 2017, XP55338911 (6 pp.).
Salaets, B., *Optimizing mobile VAS service platforms with intelligent traffic steering*, Feb. 24, 2014, XP55339376 (3 pp.).
International Search Report dated Dec. 17, 2014 in corresponding International Application No. PCT/CN2014/073472.
Russian Decision to Grant dated Apr. 26, 2018, in corresponding Russian Patent Application No. 2016140245/08, 36 pgs.

* cited by examiner

METHOD AND APPARATUS FOR CONTROLLING SERVICE CHAIN OF SERVICE FLOW

CROSS-REFERENCE TO RELATED APPLICATIONS

This application is a continuation of International Application No. PCT/CN2014/073472 filed on Mar. 14, 2014, the disclosure of which is hereby incorporated by reference in its entirety.

TECHNICAL FIELD

The present invention relates to the field of wireless communications technologies, and in particular, to a method and apparatus for controlling a service chain of a service flow.

BACKGROUND

Currently, a Gi local area network (Gi LAN) mechanism is applied more widely. FIG. 1 is a schematic diagram of application that UE accesses a network by using a Gi local area network. A flow classifier (Flow Classifier) is a logical network element, and is primarily used to perform deep packet inspection (DPI) processing on a packet. The logical network element may be integrated into a gateway such as a gateway GPRS support node (GGSN), or a packet data network gateway (PDN GW), or may be a standalone DPI device. A policy and charging rule function (PCRF) entity is used for policy control decision and a flow charging control function. A switch is primarily used for route processing of a data packet. A service node is primarily used for service processing of a packet, for example, video optimization processing on a video packet, and web acceleration processing on a web packet. A controller is primarily used for Gi LAN control, for example, controlling service chain (Service Chaining) processing of a service flow. A service chain in this application document refers to a processing process of multiple types of service processing performed on a service flow, for example, video optimization processing is performed on a video service flow first, and then firewall processing and the like are performed.

In the prior art, when single UE needs to send a service request to an Internet server by using a Gi LAN, the UE sends service request information to a controller; according to a service chain control method in the Gi LAN, the controller generates service chain control information corresponding to the service request initiated by the UE, and according to the service chain control information, the controller can process only a service chain corresponding to the service request initiated by the UE. When new UE initiates a service request, new service chain control information needs to be generated based on the service request of the new UE, and service chain control information of a service flow of another UE is not helpful to control of a service chain of the UE that is initiating the service request, thereby causing a great workload of service chain control that is based on the service flow of the UE.

SUMMARY

Embodiments of the present invention provide a method and apparatus for controlling a service chain of a service flow, and enables opening a Gi LAN capability to a content provider/service provider, which resolves a problem of a great workload of service chain control that is based on the service flow of the UE in a Gi LAN mechanism.

According to a first aspect, an embodiment of the present invention provides a method for controlling a service chain of a service flow, where the method includes:
receiving, by a service chain management system, a service processing customization request message sent by a content provider server/service provider server;
generating, by the service chain management system according to a service processing customization condition carried in the service processing customization request message, service chain information of a service flow corresponding to the content provider server/service provider server; and
constructing, by the service chain management system based on the service chain information, service chain control information corresponding to a service chain, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server.

According to the first aspect, in a first possible implementation manner, the service processing customization condition includes: content provider server/service provider server identification information; or content provider/service provider identification information and a service processing type corresponding to a service flow provided by the content provider server/service provider server; or content provider server/service provider server identification information and a service type corresponding to the content provider server/service provider server; or content provider/service provider identification information, a service processing type corresponding to a service flow provided by the content provider server/service provider server, and a service type corresponding to the content provider server/service provider server.

According to the first aspect, in a second possible implementation manner, the service chain information includes: service chain sequence information, and service flow information corresponding to the service chain; or service chain sequence information, service flow information corresponding to the service chain, and service chain identification information; and the service chain control information includes: the service chain sequence information and the service chain identification information; or the service chain sequence information and the service flow information corresponding to the service chain.

According to the second possible implementation manner of the first aspect, in a third possible implementation manner, the service chain sequence information includes a service processing sequence corresponding to a service flow provided by the content provider server/service provider server, and information about network elements that execute different types of service processing. The service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the first aspect, in a fourth possible implementation manner, the method further includes: constructing, by the service chain management system, service flow control information according to the service chain information, and sending the service flow control information to a policy and charging rule function entity PCRF, so that the PCRF sends first service flow control policy information to a flow classifier when receiving service flow information sent by the flow classifier, so that the flow classifier forwards, according to the first service flow control policy information, the received service flow corresponding to the content provider server/service provider server to the switch for processing.

According to the fourth possible implementation manner of the first aspect, in a fifth possible implementation manner, the service flow control information includes: service flow information corresponding to the service chain, and route information of next service processing; or service flow information corresponding to the service chain, route information of next service processing, and service chain identification information.

According to the fourth possible implementation manner of the first aspect, in a sixth possible implementation manner, the first service flow control policy information specifically includes: quintuple information corresponding to the service flow, and route information of next service processing; or quintuple information corresponding to the service flow, route information of next service processing, and service chain identification information; or quintuple information corresponding to the service flow, a service type corresponding to the service flow, and route information of next service processing; or quintuple information corresponding to the service flow, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the first aspect, in a seventh possible implementation manner, the method further includes: constructing, by the service chain management system, service flow control information according to the service chain information, and sending the service flow control information to a PCRF, so that the PCRF sends second service flow control policy information to a flow classifier, so that the flow classifier forwards, according to the second service flow control policy information, the received service flow corresponding to the content provider server/service provider server to the switch for processing.

According to the seventh possible implementation manner of the first aspect, in an eighth possible implementation manner, the second service flow control policy information specifically includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to a second aspect, an embodiment of the present invention provides a method for controlling a service chain of a service flow, where the method includes:

receiving, by a flow classifier, a service request message sent by user equipment UE, where the service request message carries service flow information of a service flow corresponding to the service request message;

acquiring, by the flow classifier according to the service flow information of the service flow corresponding to the service request message, service flow control policy information corresponding to service request information and sent by a PCRF, where the service flow control policy information is constructed by the PCRF based on service chain control information sent by a service chain management system;

receiving, by the flow classifier, a downlink packet that is sent by a content provider server/service provider server according to the service request message; and sending, by the flow classifier, the downlink packet to a switch according to service flow information of the downlink packet and the service flow control policy information, so that the switch performs service processing according to flow forwarding policy information delivered by a controller.

According to the second aspect, in a first possible implementation manner, the service flow information of the service flow corresponding to the service request message includes: quintuple information, service type information corresponding to the service flow, and content provider server/service provider server identification information or content provider/service provider identification information.

According to the second aspect, in a second possible implementation manner, the service flow control policy information includes: service flow information corresponding to a service chain, and route information of next service processing; or service flow information corresponding to a service chain, route information of next service processing, and service chain identification information.

According to the second possible implementation manner of the second aspect, in a third possible implementation manner, the service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the second aspect, in a fourth possible implementation manner, the sending, by the flow classifier, the downlink packet to a switch according to service flow information of the downlink packet and the corresponding service flow control policy information specifically includes: if determining that quintuple information of the received downlink packet is the same as quintuple information in a piece of service flow control policy information, obtaining, by the flow classifier, service chain identification information in the service flow control policy information; or if determining that quintuple information and a service type of the received downlink packet are the same as a quintuple and a service type in a service flow control policy, obtaining service chain identification information in the service flow control policy; or if determining that content provider/service provider identification information of the received downlink packet is the same as content provider/service provider identification information in a service flow control policy, obtaining service chain identification information in the service flow control policy; or if determining that content provider/service provider identification information and a service type of the received downlink packet are the same as content provider/service provider identification information and a service type in a service flow control policy, obtaining service chain identification information in the service flow control policy.

According to a third aspect, an embodiment of the present invention further provides a method for controlling a service chain of a service flow, where the method includes:

receiving, by a flow classifier, a downlink packet sent by a content provider server/service provider server;

acquiring, by the flow classifier according to service flow information of the downlink packet, service flow control policy information corresponding to the downlink packet and sent by a PCRF, where the service flow control policy information is constructed by the PCRF based on service chain control information sent by a service chain management system; and sending, by the flow classifier according to the service flow control policy information corresponding to the downlink packet, the downlink packet to a switch for processing.

According to the third aspect, in a first possible implementation manner, the service flow control policy information includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the third aspect, in a second possible implementation manner, the sending, by the flow classifier according to the service flow control policy information corresponding to the downlink packet, the downlink packet to a switch for processing specifically includes: obtaining, by the flow classifier, service chain identification information, and sending the downlink packet that includes the service chain identification information to the switch; and the obtaining service chain identification information specifically includes: if determining that quintuple information of the received downlink packet is the same as quintuple information in a piece of service flow control policy information, obtaining service chain identification information in the service flow control policy information; or if determining that quintuple information and a service type of the received downlink packet are the same as a quintuple and a service type in a service flow control policy, obtaining service chain identification information in the service flow control policy; or if determining that content provider/service provider identification information of the received downlink packet is the same as content provider/service provider identification information in a service flow control policy, obtaining service chain identification information in the service flow control policy; or if determining that content provider/service provider identification information and a service type of the received downlink packet are the same as content provider/service provider identification information and a service type in a service flow control policy, obtaining service chain identification information in the service flow control policy.

According to a fourth aspect, an embodiment of the present invention provides a method for controlling a service chain of a service flow, where the method includes:

receiving, by a controller/PCRF, service chain control information sent by a service chain management system, where the service chain control information includes: service chain sequence information and service chain identification information; or service chain sequence information and service flow information corresponding to a service chain; and sending, by the controller/PCRF, flow forwarding policy information to a switch based on the service chain control information, so that the switch performs service processing on a received packet according to a service chain corresponding to the packet and according to the flow forwarding policy information.

According to the fourth aspect, in a first possible implementation manner, the service chain control information includes: service chain sequence information and service chain identification information; or service chain sequence information, and service flow information corresponding to the service chain.

With reference to the first possible implementation manner of the fourth aspect, in a second possible implementation manner, the service chain sequence information includes a service processing sequence corresponding to a service flow provided by a content provider server/service provider server, and information about network elements that execute different types of service processing; and the service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the fourth aspect, in a third possible implementation manner, the flow forwarding policy information includes: a service chain identifier, and a forwarding table corresponding to the service chain; or service flow information corresponding to the service chain, and a forwarding table corresponding to the service chain, where the forwarding table includes the service chain sequence information.

According to the fourth aspect, in a fourth possible implementation manner, the method further includes: sending, by the controller/PCRF, first service flow control policy information to a flow classifier based on the service chain control information when receiving service flow information sent by the flow classifier.

According to the fourth possible implementation manner of the fourth aspect, in a fifth possible implementation manner, the first service flow control policy information specifically includes: quintuple information corresponding to the service flow, and route information of next service processing; or quintuple information corresponding to the service flow, route information of next service processing, and service chain identification information; or quintuple information corresponding to the service flow, a service type corresponding to the service flow, and route information of next service processing; or quintuple information corresponding to the service flow, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the fourth aspect, in a sixth possible implementation manner, the method further includes: sending, by the controller/PCRF, second service flow control policy information to a flow classifier based on the service chain control information, so that the flow classifier that receives the packet sends the packet to a next-hop routing node according to the second service flow control policy information.

According to the sixth possible implementation manner of the fourth aspect, in a seventh possible implementation manner, the second service flow control policy information specifically includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to a fifth aspect, an embodiment of the present invention provides an apparatus for controlling a service chain of a service flow, where the apparatus includes:

a receiving unit, configured to receive a service processing customization request message sent by a content provider server/service provider server;

a generation unit, configured to generate, according to a service processing customization condition carried in the service processing customization request message, service chain information of a service flow corresponding to the content provider server/service provider server; and a sending unit, configured to construct, based on the service chain information, service chain control information corresponding to a service chain, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server.

According to the fifth aspect, in a first possible implementation manner, the service processing customization condition includes: content provider server/service provider server identification information; or content provider/service provider identification information and a service processing type corresponding to a service flow provided by the content provider server/service provider server; or content provider server/service provider server identification information and a service type corresponding to the content provider server/service provider server; or content provider/service provider identification information, a service processing type corresponding to a service flow provided by the content provider server/service provider server, and a service type corresponding to the content provider server/service provider server.

According to the fifth aspect, in a second possible implementation manner, the service chain information includes: service chain sequence information, and service flow information corresponding to the service chain; or service chain sequence information, service flow information corresponding to the service chain, and service chain identification information.

According to the second possible implementation manner of the fifth aspect, in a third possible implementation manner, the service chain sequence information includes a service processing sequence corresponding to a service flow provided by the content provider server/service provider server, and information about a network element that executes each type of service processing; and the service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the fifth aspect, in a fourth possible implementation manner, the sending unit is further configured to: construct service flow control information according to the service chain information, and send the service flow control information to a policy and charging rule function entity PCRF, so that the PCRF sends first service flow control policy information to a flow classifier when receiving service flow information sent by the flow classifier, so that the flow classifier forwards, according to the first service flow control policy information, the received service flow corresponding to the content provider server/service provider server to the switch for processing.

According to the fourth possible implementation manner of the fifth aspect, in a fifth possible implementation manner, the service flow control information includes: service flow information corresponding to the service chain, and route information of next service processing; or service flow information corresponding to the service chain, route information of next service processing, and service chain identification information.

According to the fourth possible implementation manner of the fifth aspect, in a sixth possible implementation manner, the first service flow control policy information specifically includes: quintuple information corresponding to the service flow, and route information of next service processing; or quintuple information corresponding to the service flow, route information of next service processing, and service chain identification information; or quintuple information corresponding to the service flow, a service type corresponding to the service flow, and route information of next service processing; or quintuple information corresponding to the service flow, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the fifth aspect, in a seventh possible implementation manner, the sending unit is further configured to: construct service flow control information according to the service chain information, and send the service flow control information to a PCRF, so that the PCRF sends second service flow control policy information to a flow classifier, so that the flow classifier forwards, according to the second service flow control policy information, the received service flow corresponding to the content provider server/service provider server to the switch for processing.

According to the seventh possible implementation manner of the fifth aspect, in an eighth possible implementation manner, the second service flow control policy information specifically includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to a sixth aspect, an embodiment of the present invention provides an apparatus for controlling a service chain of a service flow, where the apparatus includes:

a receiving unit, configured to receive a service request message sent by UE, where the service request message carries service flow information of a service flow corresponding to the service request message;

an acquiring unit, configured to acquire, according to the service flow information of the service flow corresponding to the service request message, service flow control policy information corresponding to service request information and sent by a PCRF, where the service flow control policy information is constructed by the PCRF based on service chain control information sent by a service chain management system;

the receiving unit is further configured to receive a downlink packet that is sent by a content provider server/service provider server according to the service request message; and a sending unit, configured to send the downlink packet to a switch according to service flow information of the downlink packet and the corresponding service flow control policy information, so that the switch forwards the downlink packet to a corresponding network element for service processing.

According to the sixth aspect, in a first possible implementation manner, the service flow information of the service flow corresponding to the service request message includes: quintuple information, service type information corresponding to the service flow, and content provider server/service provider server identification information or content provider/service provider identification information.

According to the sixth aspect, in a second possible implementation manner, the service flow control policy information includes: service flow information corresponding to a service chain, and route information of next service processing; or service flow information corresponding to a service chain, route information of next service processing, and service chain identification information.

According to the second possible implementation manner of the sixth aspect, in a third possible implementation manner, the service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the sixth aspect, in a fourth possible implementation manner, the sending unit is specifically configured to: obtain service chain identification information, and send the downlink packet that includes the service chain identification information to the switch, where the service chain identification information may be obtained in the following manner: if quintuple information of the received downlink packet is the same as quintuple information in a piece of service flow control policy information, service chain identification information of the service flow control policy is the acquired service chain identification information; or if quintuple information and a service type of the received downlink packet are the same as a quintuple and a service type in a service flow control policy, service chain identification information in the service flow control policy is the acquired service chain identification information; or if content provider/service provider identification information of the received downlink packet is the same as content provider/service provider identification information in a service flow control policy, service chain identification information in the service flow control policy is the acquired service chain identification information; or if content provider/service provider identification information and a service type of the received downlink packet are the same as content provider/service provider identification information and a service type in a service flow control policy, service chain identification information in the service flow control policy is the acquired service chain identification information.

According to a seventh aspect, an embodiment of the present invention further provides an apparatus for controlling a service chain of a service flow, where the apparatus includes:

a receiving unit, configured to receive a downlink packet sent by a content provider server/service provider server;

a query unit, configured to acquire, according to service flow information of the downlink packet, service flow control policy information corresponding to the downlink packet and sent by a PCRF, where the service flow control policy information is constructed by the PCRF based on service chain control information sent by a service chain management system; and a sending unit, configured to send, according to the service flow control policy information corresponding to the downlink packet, the downlink packet to a switch for processing.

According to the seventh aspect, in a first possible implementation manner, the service flow control policy information includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the seventh aspect, in a second possible implementation manner, the sending unit is specifically configured to: obtain service chain identification information, and send the downlink packet that includes the service chain identification information to the switch, where the service chain identification information may be obtained in the following manner: if a source address of the received downlink packet is the same as content provider server/service provider server identification information in a service flow control policy, service chain identification information in the service flow control policy is the acquired service chain identification information; or if a source address and a service type of the received downlink packet are the same as content provider server/service provider server identification information and a service type in a service flow control policy, service chain identification information in the service flow control policy is the acquired service chain identification information; or if content provider/service provider identification information of the received downlink packet is the same as content provider/service provider identification information in a service flow control policy, service chain identification information in the service flow control policy is the acquired service chain identification information; or if content provider/service provider identification information and a service type of the received downlink packet are the same as content provider/service provider identification information and a service type in a service flow control policy, service chain identification information in the service flow control policy is the acquired service chain identification information.

According to an eighth aspect, an embodiment of the present invention provides an apparatus for controlling a service chain of a service flow, where the apparatus includes:

a receiving unit, configured to receive service chain control information sent by a service chain management system, where the service chain control information includes: service chain sequence information and service chain identification information; or service chain sequence information and service flow information corresponding to a service chain; and a sending unit, configured to send flow forwarding policy information to a switch based on the service chain control information, so that the switch performs service processing on a received packet according to a service chain corresponding to the packet and according to the flow forwarding policy information.

According to the eighth aspect, in a first possible implementation manner, the service chain sequence information includes a service processing sequence corresponding to a service flow provided by a content provider server/service provider server, and information about network elements that execute different types of service processing.

With reference to the first possible implementation manner of the eighth aspect, in a second possible implementation manner, the service chain sequence information includes a service processing sequence corresponding to a service flow provided by a content provider server/service provider server, and information about a network element that executes each type of service processing; and the service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow.

According to the eighth aspect, in a third possible implementation manner, the flow forwarding policy information includes: a service chain identifier, and a forwarding table corresponding to the service chain; or service flow information corresponding to the service chain, and a forwarding table corresponding to the service chain, where the forwarding table includes the service chain sequence information.

According to the eighth aspect, in a fourth possible implementation manner, the sending unit is further configured to send first service flow control policy information to a flow classifier based on the service chain control information when receiving service flow information sent by the flow classifier.

According to the fourth possible implementation manner of the eighth aspect, in a fifth possible implementation manner, the first service flow control policy information specifically includes: quintuple information corresponding to the service flow, and route information of next service processing; or quintuple information corresponding to the service flow, route information of next service processing, and service chain identification information; or quintuple information corresponding to the service flow, a service type corresponding to the service flow, and route information of next service processing; or quintuple information corresponding to the service flow, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the eighth aspect, in a sixth possible implementation manner, the sending unit is further configured to send second service flow control policy information to a flow classifier based on the service chain control information.

According to the sixth possible implementation manner of the eighth aspect, in a seventh possible implementation manner, the second service flow control policy information specifically includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

According to the method and apparatus for controlling a service chain provided in the embodiments of the present invention, a service processing customization request message sent by a content provider server/service provider server is received, and service chain information of a service flow corresponding to the content provider server/service provider server is generated according to a service processing customization condition carried in the service processing customization request message. Service chain control information corresponding to a service chain is constructed based on the service chain information, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server. In this way, the technical solution provided in the embodiments of the present invention can implement service chain control on a per content provider/service provider basis in a Gi LAN mechanism. Therefore, when UE uses a Gi local area network to access service content provided by the content provider server/service provider server, network elements such as the controller and the switch can perform corresponding processing on the service flow according to the service chain information of the content provider/service provider, thereby reducing a workload of service chain control that is based on the service flow of the UE.

DESCRIPTION OF EMBODIMENTS

Figure 1:
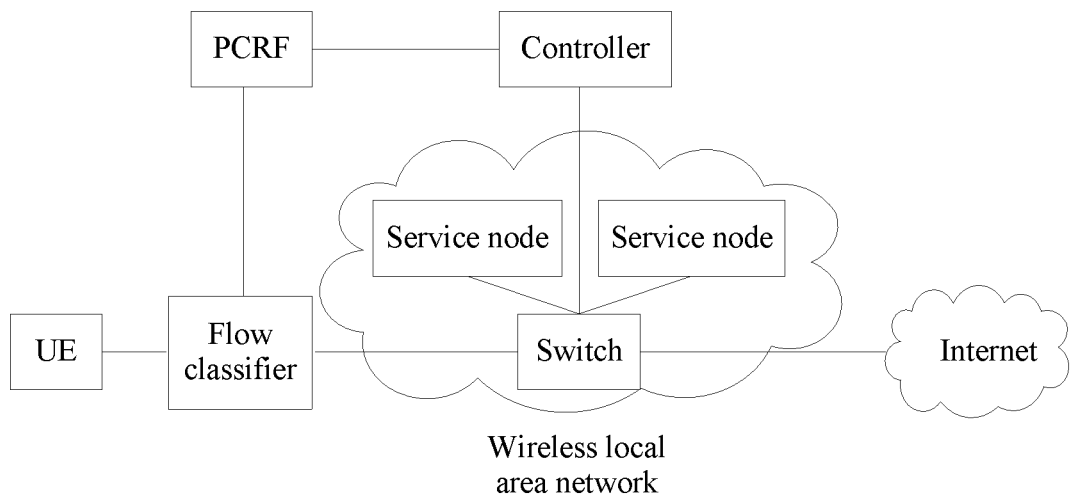
FIG. 1 is a schematic diagram of application that UE accesses a network by using a Gi local area network.

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

In practical application, a method and apparatus for controlling a service chain of a service flow in the embodiments of the present invention may be applied as a new method for controlling a service chain of a service flow in a scenario in which a content provider or service provider (described as a content provider/service provider) provides a service flow for a user over a Gi LAN, where the content provider is primarily an enterprise that comprehensively provides an Internet information service and a value-added service for users, and the service provider is primarily an enterprise that provides an additional communications service that is developed by using resources of a public telecommunications network and other communications equipment. In this scenario, a content provider server/service provider server may send a service processing customization request message to a service chain management system or a service chain management entity first, so that the service chain management system generates, according to the service processing customization request message, service chain control information that is used to control service processing of the service flow sent by the content provider/service provider, and transmits the service chain control information to each network entity. Further, when receiving the service flow of the content provider/service provider, a switch may perform corresponding service processing on the service flow according to the service chain, and sends the processed service flow to a user terminal. In this way, when a user uses the Gi LAN to access service content provided by the content provider server/service provider server, network elements such as a controller and the switch can perform corresponding processing on the service flow according to the service chain of the content provider/service provider, thereby implementing service chain control on a per content provider/service provider basis and resolving a problem of a great workload of service chain control that is based on the service flow of the UE in a Gi local area network mechanism.

A service chain of a service flow in this application document consists of multiple types of service processing performed on the service flow. If video optimization processing needs to be performed on the service flow first and then firewall processing needs to be performed, a service chain of the service flow is "video optimization processing—firewall processing".

Figure 2:
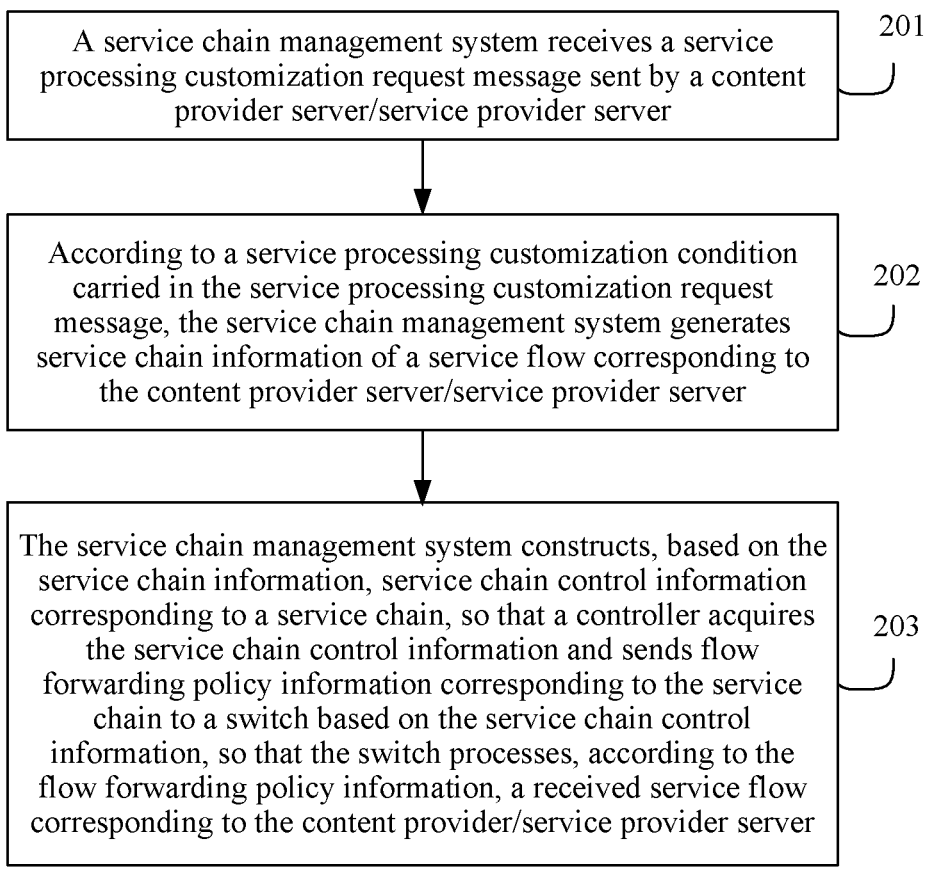
FIG. 2 is a flowchart of a method for controlling a service chain of a service flow according to an embodiment of the present invention.

FIG. 2 is a flowchart of a method for controlling a service chain of a service flow according to an embodiment of the present invention. This embodiment is executed by a service chain management system. The service chain management system may be implemented in a controller in FIG. 1, or may be implemented in a capability-opened network element, or may be implemented in an operation support system (Operation Support System, OSS), or may be located in an independent functional entity, where the entity may be referred to as a network management entity. As shown in the diagram, this embodiment includes the following steps:

Step 201: The service chain management system receives a service processing customization request message sent by a content provider server/service provider server.

In this embodiment of the present invention, as an example rather than limitation, the service processing customization request message carries a service processing customization condition. The service processing customization condition includes: content provider server/service provider server identification information (for example, address information, a URL (Uniform Resource Locator, uniform resource locator) or a URI (Uniform Resource Identifier, uniform resource identifier)) or content provider/service provider identification information (for example, an application identifier or a domain name) and a service processing type corresponding to a service flow provided by the content provider server/service provider server.

Optionally, the service processing customization condition may further include a service type corresponding to the content provider server/service provider server, where the service type corresponding to the content provider server/service provider server may include a video service, a voice service, a web service, and the like, and the service processing type corresponding to the service flow provided by the content provider server/service provider server may include video optimization processing, web cache processing, and the like. The service processing customization condition to be described in subsequent embodiments of the present invention is information described herein, and is not elaborated any further.

The content provider server/service provider server may implement transmission of the service processing customization request message by using an open application programming interface (Application Programming Interface, API) of a mobile operator. For example, the content provider server/service provider server invokes a service customization API interface, which is opened by a capability-opened network element (such as an open platform) of the mobile operator, to transmit the service processing customization request message to the open platform, and the open platform sends the service processing customization request message to the service chain management system.

Step 202: According to a service processing customization condition carried in the service processing customization request message, the service chain management system generates service chain information of a service flow corresponding to the content provider server/service provider server.

After receiving the service processing customization request message, the service chain management system may select, according to the service processing customization condition carried in the message, a network element corresponding to the service processing. For example, if the customized service processing includes video optimization processing, the service chain management system selects a video optimization processing network element; or, if the customized service processing includes web cache processing, the service chain management system selects a web cache processing network element. In this way, the service chain management system can generate the corresponding service chain information.

The service chain information includes: service chain sequence information, and service flow information corresponding to a service chain; or service chain sequence information, service flow information corresponding to a service chain, and service chain identification information (used to identify a service chain such as a service chain ID). The service chain information to be described in subsequent embodiments of the present invention is information described here, and is not elaborated any further.

The service chain sequence information includes a service processing sequence corresponding to the service flow provided by the content provider server/service provider server, and information about network elements that execute different types of service processing. The service flow information corresponding to the service chain includes: content provider server/service provider server identification information; or content provider server/service provider server identification information and a service type corresponding to the service flow; or content provider/service provider identification information; or content provider/service provider identification information and a service type corresponding to the service flow. The service chain sequence information and the service flow information corresponding to the service chain that are to be described in subsequent embodiments of the present invention are information described here, and are not elaborated any further.

Step 203: Based on the service chain information, the service chain management system constructs service chain control information corresponding to a service chain, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server.

The service chain control information includes: service chain sequence information, and service chain identification information; or service chain sequence information, and service flow information corresponding to the service chain.

The flow forwarding policy information includes: a service chain identifier, and a forwarding table corresponding to the service chain, where the forwarding table includes service chain sequence information; or service flow information corresponding to the service chain, and a forwarding table corresponding to the service chain, where the forwarding table includes service chain sequence information.

The service chain management system sends the service chain control information to the controller, so that the controller sends the flow forwarding policy information corresponding to the service chain to the switch based on the service chain control information. After receiving the service flow forwarded by a flow classifier, the switch may send, according to the service chain control information, the service flow to a corresponding service node for corresponding service processing.

Preferably, after step 202 is executed, the service chain management system may further construct service flow control information according to the service chain information, and send the service flow control information corresponding to the service chain to a policy and charging rule function entity PCRF, so that the PCRF sends first service flow control policy information to the flow classifier when receiving service flow information sent by the flow classifier. The service flow information is obtained in the following manner: The flow classifier receives a service request message sent by UE, acquires service flow information of a service flow corresponding to the service request message from the service request message, and sends the service flow information to the PCRF. The service flow control information includes: service flow information corresponding to the service chain, and route information of next service processing (that is, next-hop route information after the switch receives and processes the service flow of the content provider server/service provider server); or service flow information corresponding to the service chain, route information of next service processing, and service chain identification information. The PCRF constructs the first service flow control policy information according to the service flow information and the service flow control information that are sent by the flow classifier. Correspondingly, the first service flow control policy information specifically includes: quintuple information corresponding to the service flow (a source IP address, a source port, a destination IP address, a destination port, and a transport layer protocol number), and route information of next service processing; or quintuple information corresponding to the service flow, route information of next service processing, and service chain identification information; or quintuple information corresponding to the service flow, a service type corresponding to the service flow, and route information of next service processing; or quintuple information corresponding to the service flow, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information. The first service flow control policy information to be described in subsequent embodiments of the present invention is information described here, and is not elaborated any further.

Preferably, after step 202 is executed, the service chain management system may also construct service flow control information according to the service chain information, and send the service flow control information to a policy and charging rule function entity PCRF, so that the PCRF sends second service flow control policy information to a flow classifier, so that the flow classifier forwards, according to the second service flow control policy information, the received service flow corresponding to the content provider server/service provider server to the switch for processing. The second service flow control policy information specifically includes:

content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information. The second service flow control policy information to be described in subsequent embodiments of the present invention is information described here, and is not elaborated any further.

From the foregoing, it can be seen that content of the second service flow control policy information delivered actively by the PCRF to the flow classifier is different from content of the first service flow control policy information delivered by the PCRF after the PCRF receives the service flow control information sent by the flow classifier. If the PCRF actively delivers the second service flow control policy information to the flow classifier, the second service flow control policy information is thus stored in the flow classifier. After the flow classifier receives a downlink packet of each UE, the flow classifier may query the stored second service flow control policy information to obtain service flow control policy information corresponding to the downlink packet. Therefore, the flow classifier acquires the service flow control policy information without a need to interact with the PCRF, and signaling exchanged between the flow classifier and the PCRF is reduced significantly.

According to the method for controlling a service chain of a service flow provided in this embodiment of the present invention, a service processing customization request message sent by a content provider server/service provider server is received, and service chain information of a service flow corresponding to the content provider server/service provider server is generated according to a service processing customization condition carried in the service processing customization request message. Corresponding service chain control information is constructed based on the service chain information, so that a controller acquires the service chain control information and sends flow forwarding policy information corresponding to a service chain to a switch based on the service chain control information, so that the switch processes, according to the flow forwarding policy information, a received service flow corresponding to the content provider server/service provider server. In this way, the technical solution provided in this embodiment of the present invention can implement the following: When a user uses a Gi local area network to access service content provided by the content provider server/service provider server, network elements such as the controller and the switch can perform corresponding processing on the service flow according to a service chain of a content provider/service provider, thereby implementing service chain control on a per content provider/service provider basis and avoiding a problem of a great service chain control workload caused by a need of generating service chain control information for a service request of each UE in the prior art. According to the technical solution of the present invention, a value-added service of a mobile operator can be opened to a third-party content provider server/service provider server, thereby implementing monetary processing on value-added services such as service processing and increasing incomes of the mobile operator.

The foregoing embodiment describes a method for generating a service chain by a service chain management system; and the following uses an embodiment to describe a method for forwarding a service request message and a corresponding downlink packet according to related information of a service chain after a flow classifier receives the service request message, that is, a method for applying a service chain in practical application.

Figure 3:
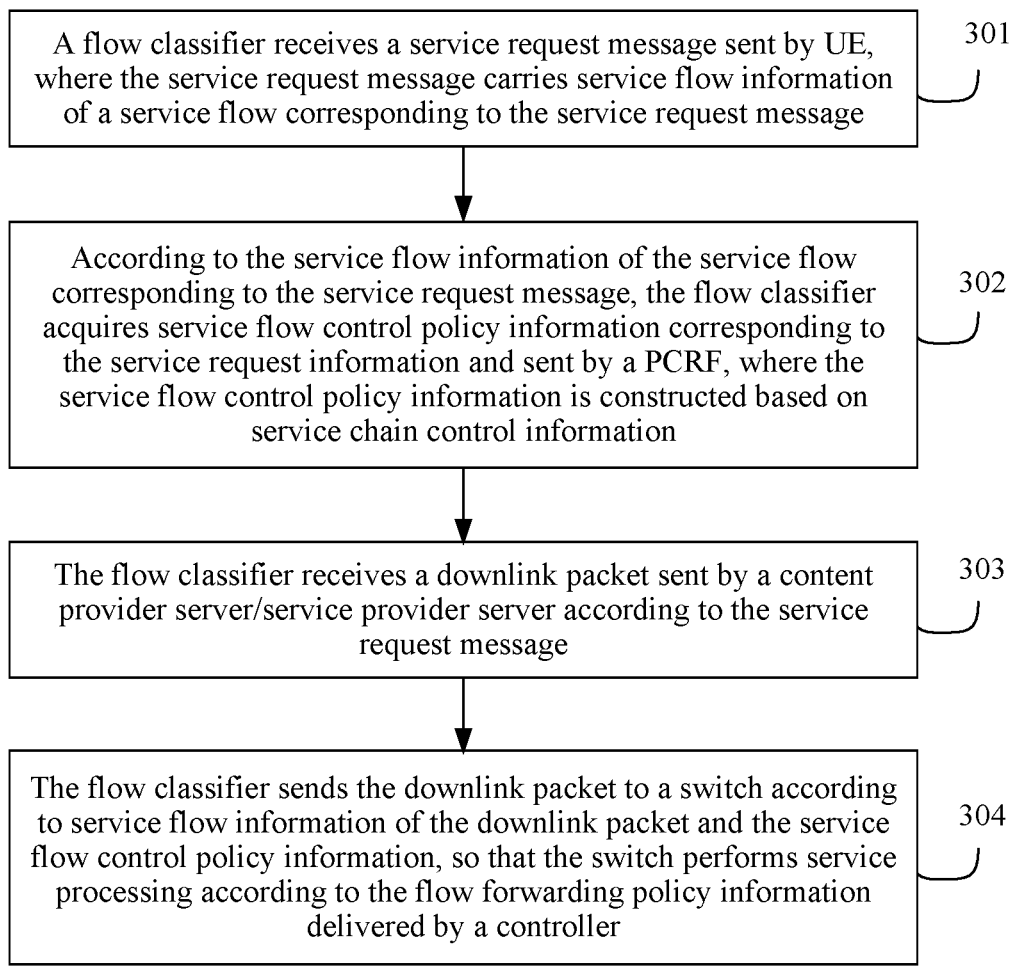
FIG. 3 is a flowchart of another method for controlling a service chain of a service flow according to an embodiment of the present invention.

FIG. 3 is a flowchart of another method for controlling a service chain of a service flow according to an embodiment of the present invention. This embodiment is executed by a flow classifier. The method provided in this embodiment may be used together with the method provided in the embodiment of the present invention shown in FIG. 2. As shown in the diagram, this embodiment includes the following execution steps:

Step 301: The flow classifier receives a service request message sent by UE, where the service request message carries service flow information of a service flow corresponding to the service request message.

After receiving the service request message sent by the UE, the flow classifier parses the service request message and may obtain service flow information corresponding to the message packet, including quintuple information, that is, a source IP address, a source port, a destination IP address, a destination port, and a transport layer protocol number, and may further obtain service type information of a service requested in the service request message, and content provider server/service provider server identification information or content provider/service provider identification information.

Step 302: According to the service flow information of the service flow corresponding to the service request message, the flow classifier acquires service flow control policy information corresponding to service request information and sent by a PCRF, where the service flow control policy information is constructed by the PCRF based on service chain control information sent by a service chain management system.

According to the service flow control policy information, the flow classifier sends the service request message to the corresponding content provider server/service provider server.

In practical application, after receiving the request message, the flow classifier may query in the flow classifier first to check whether service flow control policy information corresponding to the service flow information exists. If the service flow control policy information corresponding to the service flow information exists, the service flow control policy information is extracted from the flow classifier directly; If the service flow control policy information corresponding to the service flow information does not exist, the quintuple information, or the content provider server/service provider server identification information, or a domain name of the content provider server/service provider server may be sent to a controller or the PCRF, and the controller or the PCRF acquires the corresponding service flow control policy information according to the service flow information, and returns the service flow control policy information to the flow classifier.

In this embodiment of the present invention, the acquired service flow control policy information is first service flow control policy information.

Step 303: The flow classifier receives a downlink packet sent by a content provider server/service provider server according to the service request message.

Step 304: The flow classifier sends the downlink packet to a switch according to service flow information of the downlink packet and the corresponding service flow control policy information, so that the switch performs service processing according to flow forwarding policy information delivered by a controller.

The sending the downlink packet to a switch according to service flow information of the downlink packet and the corresponding service flow control policy information, so that the switch performs processing and then forwards the downlink packet to the UE for processing includes: obtaining service chain identification information, and sending the downlink packet that includes the service chain identification information to the switch.

The service chain identification information may be encapsulated in a packet header of the downlink packet for sending.

The service chain identification information may be specifically obtained in the following manner: if the quintuple information of the received downlink packet is the same as quintuple information in a piece of service flow control policy information, service chain identification information of this service flow control policy is the acquired service chain identification information; or if quintuple information and a service type of the received downlink packet are the same as a quintuple and a service type in a service flow control policy, service chain identification information in the service flow control policy is the acquired service chain identification information; or if content provider/service provider identification information of the received downlink packet is the same as content provider/service provider identification information in a service flow control policy, service chain identification information in the service flow control policy is the acquired service chain identification information; or if content provider/service provider identification information and a service type of the received downlink packet are the same as content provider/service provider identification information and a service type in a service flow control policy, service chain identification information in the service flow control policy is the acquired service chain identification information.

After receiving the downlink packet, the switch may perform service processing according to flow forwarding policy information delivered by the controller, and then forward the downlink packet to the UE.

The flow forwarding policy information includes the service chain identification information, and a forwarding table corresponding to a service chain; or service flow information corresponding to a service chain, and a forwarding table corresponding to the service chain, where the forwarding table includes service chain sequence information.

According to the method for controlling a service chain of a service flow in this embodiment of the present invention, a service request message sent by UE is received, where the service request message carries service flow information of a service flow corresponding to the service request message; according to the service flow information of the service flow corresponding to the service request message, service flow control policy information corresponding to service request information sent by a PCRF is acquired, where the service flow control policy information is constructed by the PCRF based on service chain control information sent by a service chain management system; a downlink packet sent by a content provider server/service provider server according to the service request message is received; and the downlink packet is sent to a switch according to service flow information of the downlink packet and the service flow control policy information, and the switch performs service processing according to flow forwarding policy information delivered by a controller. In this way, when a user accesses a service provided by this third-party content provider server/service provider server, a flow classifier can send the downlink packet to the switch according to the service flow information of the downlink packet provided by a content provider/service provider and the corresponding service flow control policy information, and the switch performs corresponding processing on the packet according to the flow forwarding policy information delivered by the controller and then forwards the packet to the UE, thereby implementing service chain control on a per content provider/service provider basis and resolving a problem of a great workload of service chain control that is based on a service flow of the UE in a Gi local area network mechanism. In addition, according to the technical solution of the present invention, a value-added service of a mobile operator can be opened to the third-party content provider server/service provider server, thereby implementing monetary processing on value-added services such as service processing and increasing incomes of the mobile operator.

The foregoing embodiment describes a process of processing a downlink packet by a flow classifier in a case in which a PCRF sends service flow control policy information after receiving service flow information sent by the flow classifier; and the following uses an embodiment to describe a process of processing a downlink packet by a flow classifier in a case in which a PCRF sends service flow control policy information to the flow classifier after receiving service flow control information delivered by a service chain management system.

Figure 4:
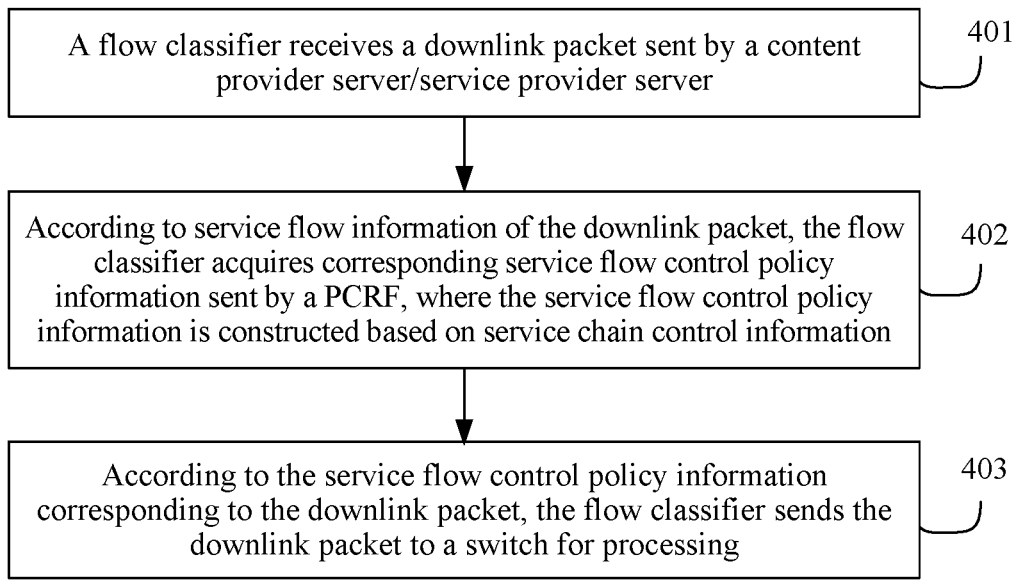
FIG. 4 is a flowchart of another method for controlling a service chain of a service flow according to an embodiment of the present invention.

FIG. 4 is a flowchart of another method for controlling a service chain of a service flow according to an embodiment of the present invention. This embodiment of the present invention is executed by a flow classifier. The method provided in this embodiment may be used together with the method provided in the embodiment of the present invention shown in FIG. 2. As shown in the diagram, this embodiment includes the following execution steps:

Step 401: The flow classifier receives a downlink packet sent by a content provider server/service provider server.

From the downlink packet, the flow classifier may obtain service flow information of a service flow corresponding to the downlink packet, where the service flow information includes quintuple information, that is, a source IP address, a source port, a destination IP address, a destination port, and a transport layer protocol number, and further includes service type information of a service requested in the service request message, and content provider server/service provider server identification information or content provider/service provider identification information.

Step 402: According to service flow information of the downlink packet, the flow classifier acquires service flow control policy information corresponding to the downlink packet and sent by a PCRF, where the service flow control policy information is constructed by the PCRF based on service chain control information sent by a service chain management system.

Locally stored service flow control policy information is delivered by the PCRF to the flow classifier after receiving service flow control information delivered by the service chain management system. The locally stored service flow control policy information specifically includes: content provider server/service provider server identification information, and route information of next service processing; or content provider server/service provider server identification information, route information of next service processing, and service chain identification information; or content provider server/service provider server identification information, a service type corresponding to the service flow, and route information of next service processing; or content provider server/service provider server identification information, a service type corresponding to the service flow, service chain identification information, and route information of next service processing; or content provider/service provider identification information, and route information of next service processing; or content provider/service provider identification information, route information of next service processing, and service chain identification information; or content provider/service provider identification information, a service type corresponding to the service flow, and route information of next service processing; or content provider/service provider identification information, a service type corresponding to the service flow, route information of next service processing, and service chain identification information.

The flow classifier may query and obtain corresponding service flow control policy information according to the service flow information of the downlink packet.

Step 403: According to the service flow control policy information corresponding to the downlink packet, the flow classifier sends the downlink packet to a switch for processing.

According to the route information of next service processing in the service flow control policy information, the flow classifier may send the downlink packet to the switch.

The sending, according to the service flow control policy information corresponding to the downlink packet, the downlink packet to a switch for processing specifically includes: obtaining service chain identification information, and sending the downlink packet that includes the service chain identification information to the switch. Specifically, the service chain identification information may be encapsulated in a packet header of the downlink packet, and the downlink packet may be sent to the switch.

The service chain identification information encapsulated in the packet header may be specifically obtained in the following manner: if source IP address information of the received downlink packet is the same as content provider server/service provider server identification information in a piece of service flow control policy information, service chain identification information of this service flow control policy is the acquired service chain identification information; or if source IP address information and a service type of the received downlink packet are the same as content provider server/service provider server identification information and a service type in a service flow control policy, service chain identification information in the service flow control policy is the acquired service chain identification information; or if content provider/service provider identification information of the received downlink packet is the same as content provider/service provider identification information in a service flow control policy, service chain identification information in the service flow control policy is the acquired service chain identification information; or if content provider/service provider identification information and a service type of the received downlink packet are the same as content provider/service provider identification information and a service type in a service flow control policy, service chain identification information in the service flow control policy is the acquired service chain identification information.

After receiving the downlink packet, the switch may perform service processing according to flow forwarding policy information delivered by a controller, and then forward the downlink packet to UE.

The flow forwarding policy information includes the service chain identification information, and a forwarding table corresponding to a service chain; or service flow information corresponding to a service chain, and a forwarding table corresponding to the service chain, where the forwarding table includes service chain sequence information.

According to the method for controlling a service chain of a service flow in this embodiment of the present invention, a downlink packet sent by a content provider server/service provider server is received; according to service flow information of the downlink packet, service flow control policy information corresponding to the downlink packet and sent by a PCRF is acquired, where the service flow control policy information is constructed by the PCRF based on service chain control information sent by a service chain management system; and according to the service flow control policy information corresponding to the downlink packet, the downlink packet is sent to a switch for processing. In this way, when a user accesses a service provided by this third-party content provider server/service provider server, a flow classifier can send the downlink packet to the switch according to the service flow information of the downlink packet provided by a content provider/service provider and the corresponding service flow control policy information, and the switch performs corresponding processing on the packet according to the flow forwarding policy information delivered by the controller and then forwards the packet to UE, thereby implementing service chain control on a per content provider/service provider basis and resolving a problem of a great workload of service chain control that is based on a service flow of the UE in a Gi local area network mechanism. In addition, in this embodiment of the present invention, the flow classifier obtains service flow control policy information corresponding to a downlink packet for each UE by querying in locally received and stored service flow control policy information. Therefore, the flow classifier acquires the service flow control policy information without a need to interact with the PCRF, and signaling exchanged between the flow classifier and the PCRF is reduced significantly. In addition, according to the technical solution of the present invention, a value-added service of a mobile operator can be opened to the third-party content provider server/service provider server, thereby implementing monetary processing on value-added services such as service processing and increasing incomes of the mobile operator. The foregoing three embodiments describe a method for generating a service chain by a service chain management system and a method for processing, by a flow classifier, a received message packet according to service flow control information; and the following uses an embodiment to describe a process of acquiring, by a controller or a PCRF, related information of a service chain from a service chain management system and notifying the related information to a flow classifier and a switch.

Figure 5:
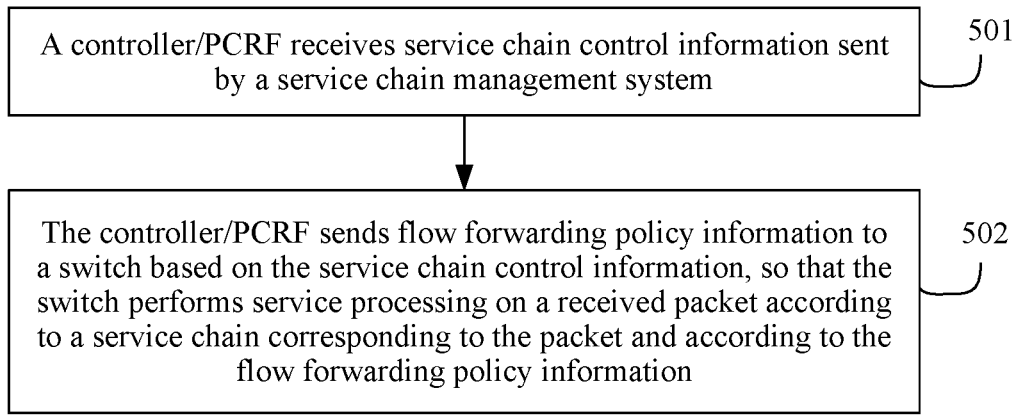
FIG. 5 is a flowchart of another method for controlling a service chain of a service flow according to an embodiment of the present invention.

FIG. 5 is a flowchart of another method for controlling a service chain of a service flow according to an embodiment of the present invention. This embodiment is executed by a network entity connected to a flow classifier and a switch, and may be a controller or a PCRF. The method provided in this embodiment of the present invention may be used together with the method provided in the embodiment of the present invention shown in FIG. 2, FIG. 3, or FIG. 4. The following describes a detailed technical solution of this embodiment of the present invention by using the controller as an execution body. As shown in the diagram, the embodiment includes the following steps:

Step 501: The controller/PCRF receives service chain control information sent by a service chain management system.

The service chain control information includes: service chain sequence information, and service chain identification information; or service chain sequence information, and service flow information corresponding to the service chain.

The service chain sequence information includes a service processing sequence corresponding to a service flow provided by a content provider server/service provider server, and information about a network element that executes each type of service processing.

Step 502: The controller/PCRF sends flow forwarding policy information to the switch based on the service chain control information, so that the switch performs service processing on a received packet according to a service chain corresponding to the packet and according to the flow forwarding policy information and then sends the packet to a receive end.

The flow forwarding policy information includes a service chain identifier, and a forwarding table corresponding to the service chain; or service flow information corresponding to the service chain, and a forwarding table corresponding to the service chain, where the forwarding table includes the service chain sequence information.

In practical application, when receiving a packet of a corresponding content provider/service provider, the switch may perform corresponding service processing on the packet according to a flow forwarding policy, and sends the processed packet to the receive end such as UE.

Preferably, the method provided in this embodiment of the present invention further includes: sending first service flow control policy information to the flow classifier based on the service chain control information when receiving service flow information sent by the flow classifier, so that the flow classifier that receives the packet sends the packet to a next-hop routing node according to the first service flow control policy information.

The method provided in this embodiment of the present invention further includes: sending second service flow control policy information to the flow classifier based on the service chain control information, so that the flow classifier that receives the packet sends the packet to a next-hop routing node according to the second service flow control policy information. The controller actively sends the second service flow control policy information to the flow classifier; therefore, interaction processes performed when the flow classifier sends request information to the PCRF to request the service flow control policy information are reduced, and service interaction processes between the flow classifier and the PCRF are reduced significantly.

In practical application, the controller may directly send the second service flow control policy information to the flow classifier after receiving service flow control information of the service chain management system, and may also send the first service flow control policy information to the flow classifier after receiving service flow information corresponding to a service request message sent by the flow classifier. After receiving a service request message related to the service flow or a service downlink packet delivered by the content provider/service provider in response to the service request, the flow classifier may directly query and obtain the corresponding service flow control policy information locally, and send the packet to the next-hop routing node according to route information of next service processing in the service flow control policy information.

In this way, this embodiment of the present invention enables a switch to process a service according to a service chain corresponding to a content provider server/service provider server when a user accesses the service provided by this third-party content provider server/service provider server, and resolves a problem of a great workload of service chain control that is based on a service flow of UE, where the problem is caused by a need of generating service chain control information based on a service request of each UE. According to the technical solution of the present invention, a value-added service of a mobile operator can be opened to the third-party content provider server/service provider server, thereby implementing monetary processing on value-added services such as service processing and increasing incomes of the mobile operator.

Figure 6A:
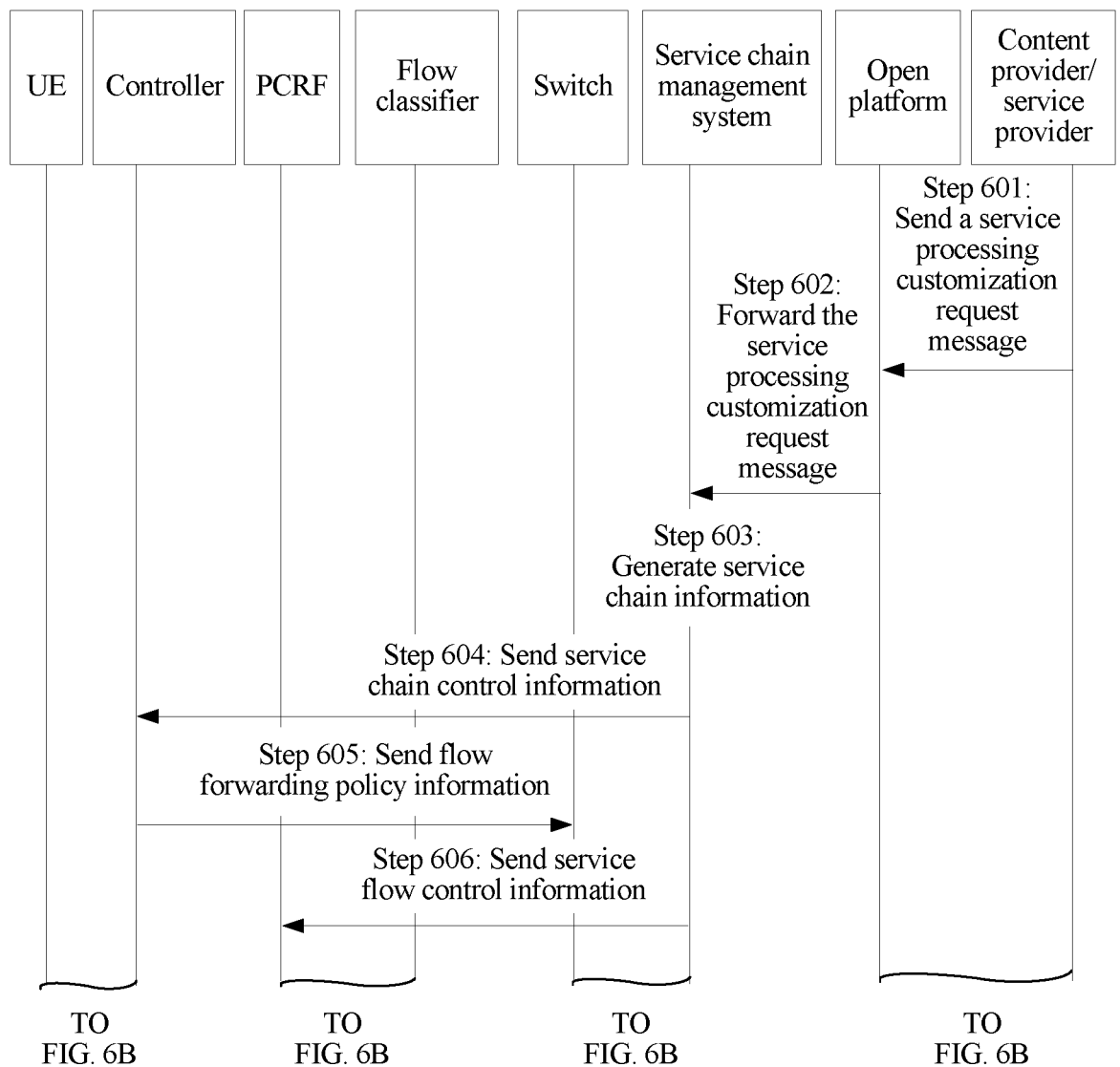
FIG. 6A and FIG. 6B are a schematic diagram of exchanging information about service chain control of a service flow between network entities in a network according to an embodiment of the present invention.
Figure 6B:
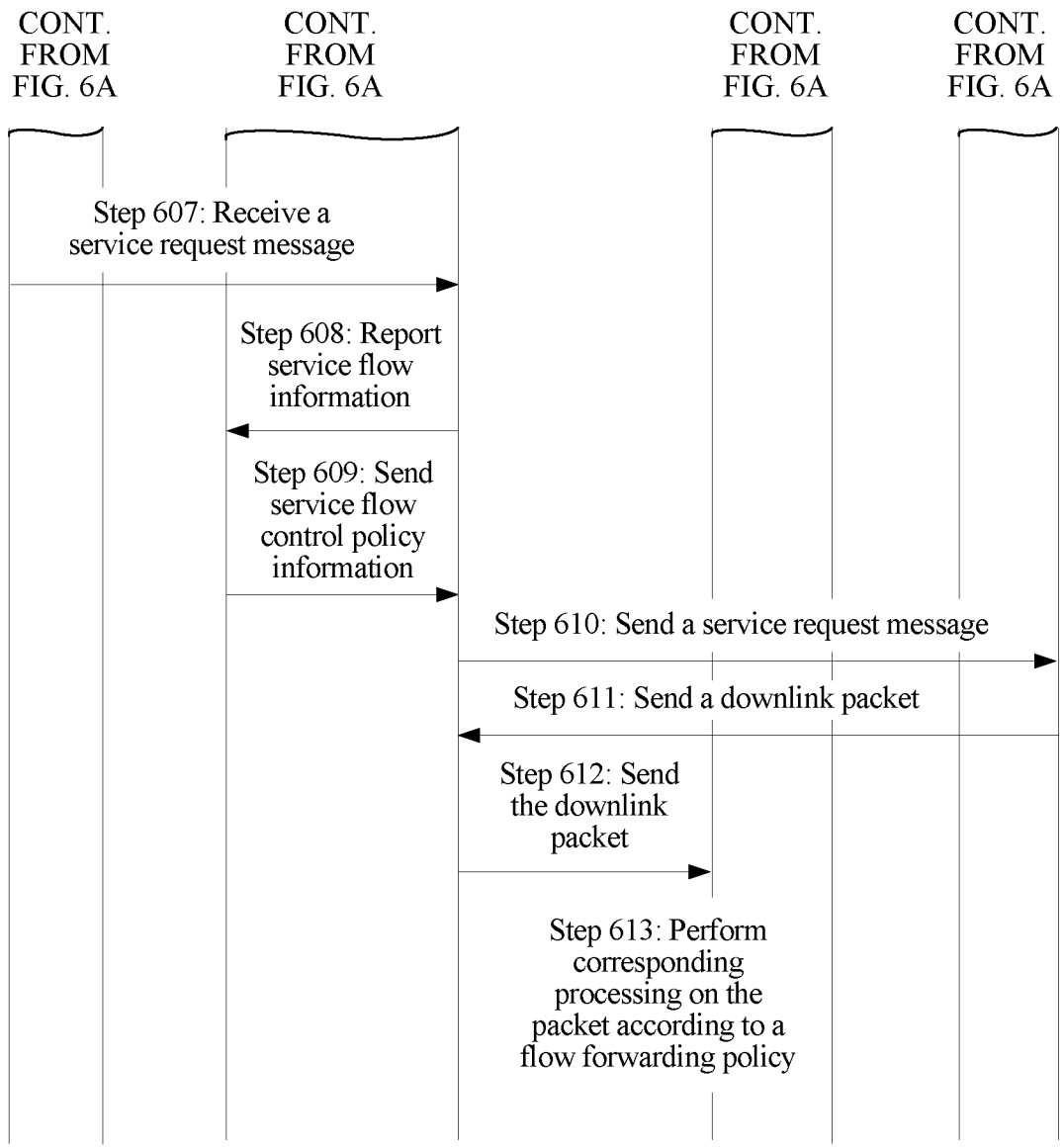

FIG. 6A and FIG. 6B are a schematic diagram of exchanging information about service chain control of a service flow between network entities in a network according to an embodiment of the present invention. The network includes a controller, a PCRF, a flow classifier, a switch, and further includes a service chain management system, an open platform, and a third-party content provider server/service provider server that accesses the service chain management system by means of the open platform. As shown in the diagram, a process of implementing service chain control of a service flow by each of the foregoing network entities is specifically as follows:

Step 601: The content provider server/service provider server sends a service processing customization request message to the open platform.

The service processing customization request message carries a service processing customization condition.

The content provider server/service provider server may transmit the service processing customization request message to the open platform by using an open API interface of a mobile operator.

Step 602: The open platform forwards the service processing customization request message to the service chain management system.

Step 603: Generate service chain information according to the service processing customization request message.

After receiving the service processing customization request message, the service chain management system may select, according to the service processing customization condition carried in the message, a network element corresponding to the service processing. For example, if the customized service processing includes video optimization processing, the service chain management system selects a video optimization processing network element; or, if the customized service processing includes web cache processing, the service chain management system selects a web cache processing network element. In this way, the service chain management system can generate the corresponding service chain information.

Step 604: Based on the service chain information, the service chain management system sends service chain control information to the controller. The service chain control information includes: service chain sequence information, and service chain identification information; or service chain sequence information, and service flow information corresponding to a service chain.

Step 605: Based on the service chain control information, the controller sends flow forwarding policy information to the switch.

The flow forwarding policy information includes a service chain identifier, and a forwarding table corresponding to the service chain; or service flow information corresponding to the service chain, and a forwarding table corresponding to the service chain, where the forwarding table includes the service chain sequence information.

Step 606: The service chain management system sends service flow control information to the PCRF.

The service flow control information includes: service flow information corresponding to the service chain, and route information of next service processing;

or service flow information corresponding to the service chain, route information of next service processing, and service chain identification information.

Step 607: The flow classifier receives a service request message sent by UE.

Step 608: Report service flow information of the service request message to the PCRF.

After receiving the service request message, the flow classifier may parse the service request message and obtain service flow information corresponding to the message packet, including quintuple information, that is, a source IP address, a source port, a destination IP address, a destination port, and a transport layer protocol number, and may further obtain a service type of a service requested in the service request message, content provider server/service provider server identification information or content provider/service provider identification information.

It should be noted that the flow classifier may report one item of the service flow information or a combination of any items of the service flow information to the PCRF.

Step 609: The PCRF sends service flow control policy information corresponding to the service flow information to the flow classifier.

Optionally, the PCRF may also directly send a service flow control policy to the flow classifier rather than send the service flow control policy after receiving the service flow information reported by the flow classifier. In practical application, related settings may be performed.

For ease of description herein, the service flow control policy information delivered by the PCRF after receiving the service flow information sent by the flow classifier may be referred to as first service flow control policy information, and the service flow control policy information delivered by the PCRF after receiving the service flow control information sent by the service chain management system may be referred to as second service flow control policy information. If the second service flow control policy information is delivered directly to the flow classifier, step 607 and step 608 may be skipped in this embodiment of the present invention.

Specifically, the PCRF may acquire the service flow control information according to a destination address in the quintuple of the received service flow information, and deliver the first service flow control policy to the flow classifier based on the service flow control information and the service flow information that is sent by the flow classifier. The first service flow control policy information includes a quintuple and route information of next service processing. If the service flow control information received from the service chain management system includes service chain identification information, the first service flow control policy information delivered to the flow classifier also includes the service chain identification information.

Alternatively, the PCRF may acquire the service flow control information according to a destination address and a service type in the received quintuple, and deliver the first service flow control policy information to the flow classifier based on the service flow control information and the service flow information that is sent by the flow classifier. The first service flow control policy includes a quintuple, a service type, and route information of next service processing. If the service flow control information acquired from the service chain management system includes service chain identification information, the first service flow control policy sent to the flow classifier also includes the service chain identification information.

Alternatively, the PCRF may acquire the service flow control information according to a received content provider/service provider identifier, and deliver the first service flow control policy information to the flow classifier based on the service flow control information. The first service flow control policy includes a content provider/service provider identifier and route information of next service processing. If the service flow control information acquired from the service chain management system includes service chain identification information, the first service flow policy information delivered to the flow classifier also includes the service chain identification information.

Alternatively, the PCRF may acquire the service flow control information according to a received content provider/service provider identifier and a received service type, and deliver the first service flow control policy information to the flow classifier based on the service flow control information. The first service flow control policy includes the content provider/service provider identifier, the service type, and route information of next service processing. If the service flow control information includes service chain identification information, the first service flow control policy also includes the service chain identification information.

Step 610: The flow classifier sends the service request message to the content provider server/service provider server.

According to the route information of next service processing in the service flow control policy information, the flow classifier may acquire a route of sending the service request message, and forward the service request message to the content provider server/service provider server by using the switch.

Step 611: The content provider server/service provider server sends a downlink packet to the flow classifier.

After receiving the service request message, the content provider/service provider may send the downlink packet to the flow classifier according to the service requested in the service request message.

Step 612: The flow classifier sends the downlink packet to the switch.

If the service flow control policy information includes the service chain identification information, the flow classifier obtains the service chain identification information, and encapsulates the service chain identification information into a packet header and sends the encapsulated packet to the switch. A method for obtaining the service chain identification information by the flow classifier is as follows:

1. If the service flow control policy information in the flow classifier is the first service flow control policy information, the flow classifier acquires the service chain identification information according to the quintuple; and if a quintuple in the received downlink packet is the same as a quintuple in a service flow control policy, service chain identification information of this service flow control policy is the service chain identification information acquired by the flow classifier; or if the service flow control policy information in the flow classifier is the second service flow control policy information, the flow classifier acquires the service chain identification information according to a source address of the downlink packet; and if the source address in the received downlink packet is the same as content provider server/service provider server identification information in a service flow control policy, service chain identification information of this service flow control policy is the service chain identification information acquired by the flow classifier.

2. If the service flow control policy information in the flow classifier is the first service flow control policy information, the flow classifier obtains the service chain identification information according to the quintuple and the service type; and if a quintuple and a service type in the received downlink packet are the same as a quintuple and a service type in a service flow control policy, service chain identification information in this service flow control policy is the service chain identification information acquired by the flow classifier; or if the service flow control policy information in the flow classifier is the second service flow control policy information, the flow classifier acquires the service chain identification information according to a source address and a service type of the downlink packet; and if the source address and the service type in the received downlink packet are the same as content provider server/service provider server identification information and a service type in a service flow control policy, service chain identification information of this service flow control policy is the service chain identification information acquired by the flow classifier.

3. The flow classifier obtains the service chain identification information according to the content provider/service provider identification information. If content provider/service provider identification information of the received downlink packet is the same as content provider/service provider identification information in a service flow control policy, service chain identification information in the service flow control policy is the service chain identification information acquired by the flow classifier.

4. The flow classifier obtains the service chain identification information according to the content provider/service provider identification information and the service type. If content provider/service provider identification information and a service type of the received downlink packet are the same as content provider/service provider identification information and a service type in a service flow control policy, service chain identification information in the service flow control policy is the service chain identification information acquired by the flow classifier.

If the service chain identification information cannot be acquired, the downlink packet is directly forwarded to the switch.

Step 613: According to a flow forwarding policy, the switch sends the received packet to a corresponding service node for corresponding service processing.

If the service chain identification information is encapsulated in the downlink packet, the switch performs corresponding service processing according to the service chain identification information. Specifically, according to the service chain identification information, the switch finds a flow forwarding policy, and acquires service chain sequence information from the flow forwarding policy information. Based on the service chain sequence information, the switch forwards the received packet to a corresponding network element for corresponding service processing. For example, if a service chain sequence is to perform video optimization processing first and then perform firewall processing, the switch forwards the packet to a video optimization processing network element first to perform video optimization processing, and after the video optimization processing, the switch forwards the packet to a firewall processing network element to perform firewall processing.

If the service chain identification information is not encapsulated in the downlink packet, the switch performs DPI parsing processing and obtains information such as the quintuple, the service type, and the content provider/service provider identifier from the downlink packet, and then the switch acquires a flow forwarding policy according to the information and then acquires the service chain sequence information from the flow forwarding policy. Based on the service chain sequence information, the switch forwards the received packet to a corresponding network element for service processing. A method for acquiring the flow forwarding policy by the switch is specifically as follows:

1. The switch queries a stored flow forwarding policy according to the source address in the quintuple, where if content provider server/service provider server identification information in a flow forwarding policy is the same as this source address, the flow forwarding policy is the flow forwarding policy acquired by the switch.

2. Alternatively, the switch queries a stored flow forwarding policy according to the source address and the service type in the quintuple, where if content provider server/service provider server identification information and a service type in a flow forwarding policy are the same as this source address and this service type, the flow forwarding policy is the flow forwarding policy acquired by the switch.

3. Alternatively, the switch queries a stored flow forwarding policy according to the content provider/service provider identification information, where if content provider/service provider identification information in a flow forwarding policy is the same as this content provider/service provider identification information, this flow forwarding policy is the flow forwarding policy acquired by the switch.

4. Alternatively, the switch queries a stored flow forwarding policy according to the content provider/service provider identification information and the service type, where if content provider/service provider identification information and a service type in a flow forwarding policy are the same as this content provider/service provider identification information and this service type, this flow forwarding policy is the flow forwarding policy acquired by the switch.

According to the service chain sequence information in the flow forwarding policy, corresponding processing may be performed on the downlink packet according to the service chain, and the processed packet is sent to the UE.

In this way, when a user accesses a service provided by a third-party content provider server/service provider server, a switch can perform processing on the service according to a service chain corresponding to the content provider server/service provider server, and this embodiment of the present invention implements service chain control on a per content provider/service provider basis and resolves a problem of a great workload of service chain control that is based on a service flow of UE in a Gi local area network mechanism. According to the technical solution of the present invention, a value-added service of a mobile operator can be opened to the third-party content provider server/service provider server, thereby implementing monetary processing on value-added services such as service processing, increasing incomes of the mobile operator, and implementing service chain control processing on a per content provider/service provider basis.

Figure 7:
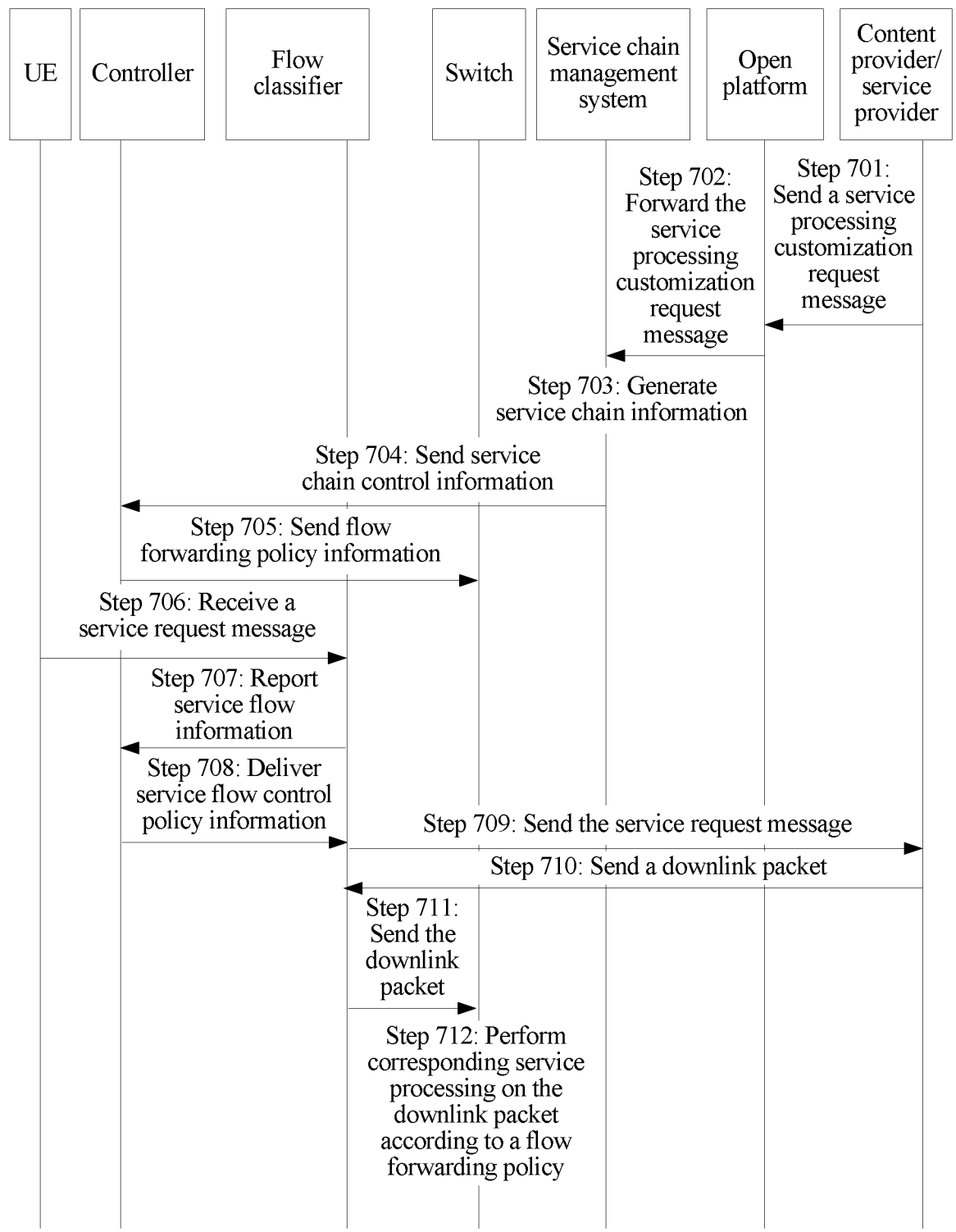
FIG. 7 is a schematic diagram of exchanging information about service chain control of a service flow between network entities in another network according to an embodiment of the present invention.

Correspondingly, if the network entity connected to the flow classifier and the switch in the network is a controller rather than a PCRF, or if the PCRF is not used when performing service chain control on a service flow in the network, reference may be made to FIG. 7 to learn a service chain control process of a service flow implemented by each network entity. FIG. 7 is a schematic diagram of exchanging information about service chain control of a service flow between network entities in another network according to an embodiment of the present invention. As shown in the diagram, details are as follows:

Step 701: The content provider server/service provider server sends a service processing customization request message to the open platform.

The service processing customization request message carries a service processing customization condition.

The content provider server/service provider server may transmit the service processing customization request message to the open platform by using an open API interface of a mobile operator.

Step 702: The open platform forwards the service processing customization request message to the service chain management system.

Step 703: Generate service chain information according to the service processing customization request message.

After receiving the service processing customization request message, the service chain management system may select, according to the service processing customization condition carried in the message, a network element corresponding to the service processing. For example, if the customized service processing includes video optimization processing, the service chain management system selects a video optimization processing network element; or, if the customized service processing includes web cache processing, the service chain management system selects a web cache processing network element. In this way, the service chain management system can generate the corresponding service chain information.

Step 704: Based on the service chain information, the service chain management system sends service chain control information to the controller. The service chain control information includes: service chain sequence information, service flow information corresponding to a service chain, and service chain identification information; or service chain sequence information, and service flow information corresponding to a service chain.

Step 705: Based on the service chain control information, the controller sends flow forwarding policy information to the switch.

The flow forwarding policy information includes a service chain identifier, and a forwarding table corresponding to the service chain; or service flow information corresponding to the service chain, and a forwarding table corresponding to the service chain, where the forwarding table includes the service chain sequence information.

Step 706: The flow classifier receives a service request message sent by UE.

Step 707: Report service flow information of the service request message to the controller.

After receiving the service request message, the flow classifier may parse the service request message and obtain service flow information corresponding to the message packet, including quintuple information, that is, a source IP address, a source port, a destination IP address, a destination port, and a transport layer protocol number, and may further obtain a service type of a service requested in the service request message, content provider server/service provider server identification information or content provider/service provider identification information.

It should be noted that the flow classifier may report one item of the service flow information or a combination of any items of the service flow information to the controller.

Step 708: The controller sends service flow control policy information corresponding to the service flow information to the flow classifier.

Optionally, the controller may also directly send a service flow control policy to the flow classifier rather than send the service flow control policy after receiving the service flow information reported by the flow classifier. In practical application, related settings may be performed.

For ease of description herein, the service flow control policy information delivered by the controller after receiving the service flow information sent by the flow classifier may be referred to as first service flow control policy information, and the service flow control policy information delivered by the PCRF directly after receiving the service flow control information sent by the service chain management system may be referred to as second service flow control policy information. If the second service flow control policy information is delivered directly to the flow classifier, step 706 and step 707 may be skipped in this embodiment of the present invention.

Specifically, the controller may acquire the service flow control information according to a destination address in the quintuple of the received service flow information, and deliver the first service flow control policy to the flow classifier based on the service flow control information. The service flow control policy information includes a quintuple and route information of next service processing. If the service flow control information received from the service chain management system includes service chain identification information, the first service flow control policy information delivered to the flow classifier also includes the service chain identification information.

Alternatively, the controller may acquire the service flow control information according to a destination address and a service type in the received quintuple, and deliver the first service flow control policy information to the flow classifier based on the service flow control information. The first service flow control policy includes a quintuple, a service type, and route information of next service processing. If the service flow control information acquired from the service chain management system includes service chain identification information, the first service flow control policy sent to the flow classifier also includes the service chain identification information.

Alternatively, the controller may acquire the service flow control information according to a received content provider/service provider identifier, and deliver the first service flow control policy information to the flow classifier based on the service flow control information. The first service flow control policy includes a content provider/service provider identifier and route information of next service processing. If the service flow control information acquired from the service chain management system includes service chain identification information, the first service flow policy information delivered to the flow classifier also includes the service chain identification information.

Alternatively, the controller may acquire the service flow control information according to a received content provider/service provider identifier and a received service type, and deliver the first service flow control policy information to the flow classifier based on the service flow control information. The first service flow control policy includes a content provider/service provider identifier, a service type, and route information of next service processing. If the service flow control information includes service chain identification information, the first service flow control policy also includes the service chain identification information.

Step 709: The flow classifier sends the service request message to the content provider server/service provider server.

According to the route information of next service processing in the service flow control policy information, the flow classifier may acquire a route of sending the service request message, and forward the service request message to the content provider server/service provider server by using the switch.

Step 710: The content provider server/service provider server sends a downlink packet to the flow classifier.

After receiving the service request message, the content provider/service provider may send the downlink packet to the flow classifier according to the service requested in the service request message.

Step 711: The flow classifier sends the downlink packet to the switch.

If the service flow control policy information includes the service chain identification information, the flow classifier obtains the service chain identification information, and encapsulates the service chain identification information into a packet header and sends the encapsulated packet to the switch. A method for obtaining the service chain identification information by the flow classifier is the same as processing in step 612, and is not elaborated herein any further.

If the service chain identification information cannot be acquired, the downlink packet is directly forwarded to the switch.

Step 712: According to a flow forwarding policy, the switch sends the received packet to a corresponding service node for corresponding service processing.

If the service chain identification information is encapsulated in the downlink packet, the switch performs corresponding service processing according to the service chain identification information. Specifically, according to the service chain identification information, the switch finds a flow forwarding policy, and acquires service chain sequence information from the flow forwarding policy information. Based on the service chain sequence information, the switch forwards the received packet to a corresponding network element for corresponding service processing. For example, if a service chain sequence is to perform video optimization processing first and then perform firewall processing, the switch forwards the packet to a video optimization processing network element first to perform video optimization processing, and after the video optimization processing, the switch forwards the packet to a firewall processing network element to perform firewall processing.

If the service chain identification information is not encapsulated in the downlink packet, the switch performs DPI parsing processing and obtains information such as the quintuple, the service type, and the content provider/service provider identifier from the downlink packet, and then the switch acquires a flow forwarding policy according to the information and then acquires the service chain sequence information from the flow forwarding policy. Based on the service chain sequence information, the switch forwards the received packet to a corresponding network element for service processing. A method for obtaining the flow forwarding policy by the switch is specifically the same as processing in step 613, and is not elaborated herein any further.

According to the service chain sequence information in the flow forwarding policy, corresponding processing may be performed on the downlink packet according to the service chain, and the processed packet is sent to the UE.

In this way, this embodiment of the present invention enables a switch to process a service according to a service chain corresponding to a content provider server/service provider server when a user accesses the service provided by this third-party content provider server/service provider server, and implements service chain control on a per content provider/service provider basis. This resolves a problem of a great workload of service chain control that is based on a service flow of UE in a Gi local area network mechanism. According to the technical solution of the present invention, a value-added service of a mobile operator can be opened to the third-party content provider server/service provider server, thereby implementing monetary processing on value-added services such as service processing, increasing incomes of the mobile operator, and implementing service chain control processing on a per content provider/service provider basis.

Correspondingly, an embodiment of the present invention further provides a schematic diagram of an apparatus for controlling a service chain of a service flow.

Figure 8:
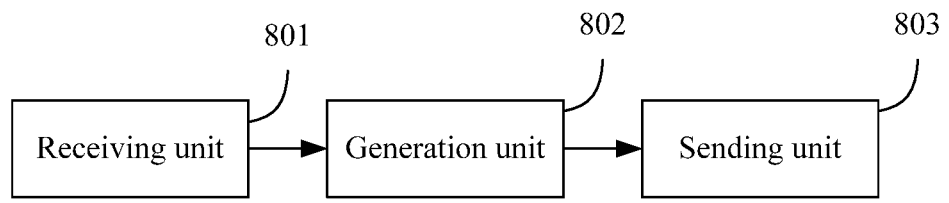
FIG. 8 is a schematic diagram of an apparatus for controlling a service chain of a service flow according to an embodiment of the present invention.

FIG. 8 is a schematic diagram of an apparatus for controlling a service chain of a service flow according to an embodiment of the present invention. As shown in the diagram, the apparatus provided in this embodiment of the present invention includes the following functional units: a receiving unit 801, a generation unit 802, and a sending unit 803.

The receiving unit 801 is configured to receive a service processing customization request message sent by a content provider server/service provider server.

In this embodiment of the present invention, as an example rather than limitation, the service processing customization request message carries a service processing customization condition.

The generation unit 802 is configured to generate, according to a service processing customization condition carried in the service processing customization request message, service chain information of a service flow corresponding to the content provider server/service provider server.

After receiving the service processing customization request message, a service chain management system may select, according to the service processing customization condition carried in the message, a network element corresponding to the service processing. For example, if the customized service processing includes video optimization processing, the service chain management system selects a video optimization processing network element; or, if the customized service processing includes web cache processing, the service chain management system selects a web cache processing network element. In this way, the service chain management system can generate the corresponding service chain information.

The sending unit 803 is configured to construct, based on the service chain information, service chain control information corresponding to a service chain, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server.

The service chain control information includes: service chain sequence information, and service chain identification information; or service chain sequence information, and service flow information corresponding to the service chain.

The service chain management system sends the service chain control information corresponding to the service chain to the controller, so that the controller sends the corresponding flow forwarding policy information to the switch based on the service chain control information, so that after receiving a service flow forwarded by a flow classifier, the switch may send, according to the flow forwarding policy information, the service flow to a corresponding service node for corresponding service processing.

The sending unit 803 is further configured to: construct service flow control information according to the service chain information, and send the service flow control information to a policy and charging rule function entity PCRF, so that the PCRF sends first service flow control policy information to a flow classifier when receiving service flow information sent by the flow classifier, so that the flow classifier forwards, according to the first service flow control policy information, the received service flow corresponding to the content provider server/service provider server to the switch for processing.

The service flow control information includes: service flow information corresponding to the service chain, and route information of next service processing; or service flow information corresponding to the service chain, route information of next service processing, and service chain identification information.

The sending unit 803 is further configured to: construct service flow control information according to the service chain information, and send the service flow control information to a PCRF, so that the PCRF sends second service flow control policy information to a flow classifier, so that the flow classifier forwards, according to the second service flow control policy information, the received service flow corresponding to the content provider server/service provider server to the switch for processing.

According to the apparatus for controlling a service chain of a service flow in this embodiment of the present invention, a service processing customization request message sent by a content provider server/service provider server is received, and service chain information of a service flow corresponding to the content provider server/service provider server is generated according to a service processing customization condition carried in the service processing customization request message. Based on the service chain information, service chain control information corresponding to a service chain is constructed and sent to a controller, so that the controller acquires the service chain control information and sends flow forwarding policy information corresponding to the service chain to a switch based on the service chain control information, so that the switch processes, according to the flow forwarding policy information, the received service flow corresponding to the content provider server/service provider server, thereby implementing service chain control on a per content provider/service provider basis. In this way, when a user uses a Gi local area network to access service content provided by the content provider server/service provider server, the technical solution provided in this embodiment of the present invention enables network elements such as the controller and the switch to perform corresponding processing on the service flow according to a service chain of a content provider/service provider, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 9:
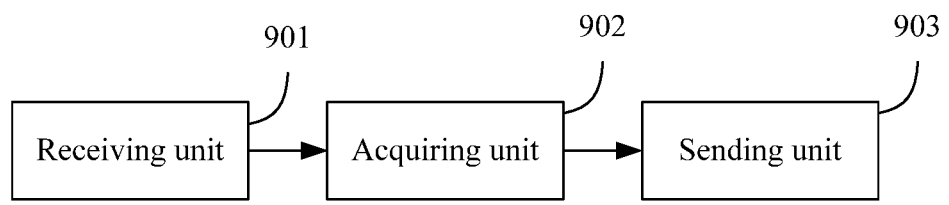
FIG. 9 is a schematic diagram of another apparatus for controlling a service chain of a service flow according to an embodiment of the present invention.

Correspondingly, an embodiment of the present invention further provides an apparatus for controlling a service chain of a service flow. FIG. 9 is a schematic diagram of another apparatus for controlling a service chain of a service flow according to an embodiment of the present invention. The apparatus may be a flow classifier. As shown in the diagram, the apparatus includes the following units: a receiving unit 901, an acquiring unit 902, and a sending unit 903.

The receiving unit 901 is configured to receive a service request message sent by UE, where the service request message carries service flow information of a service flow corresponding to the service request message.

After receiving the service request message sent by the UE, the apparatus parses the service request message and may obtain service flow information corresponding to the message packet, including quintuple information, that is, a source IP address, a source port, a destination IP address, a destination port, and a transport layer protocol number, and may further obtain service type information of a service requested in the service request message, and content provider server/service provider server identification information or content provider/service provider identification information.

The acquiring unit 902 is configured to acquire, according to the service flow information of the service flow corresponding to the service request message, service flow control policy information corresponding to service request information and sent by a PCRF, where the service flow control policy information is constructed by the PCRF based on service chain control information sent by a service chain management system.

In practical application, after receiving the request message, the apparatus may query in the flow classifier first to check whether service flow control policy information corresponding to the service flow information exists. If the service flow control policy information corresponding to the service flow information does not exist, the quintuple information, or the content provider server/service provider server identification information, or a domain name of the content provider server/service provider server may be sent to a controller or the PCRF, and the controller or the PCRF acquires the corresponding service flow control policy information according to the service flow information, and returns the service flow control policy information to the flow classifier.

In this embodiment of the present invention, for a purpose of exemplification rather than limitation, the service flow control policy information includes first service flow control policy information.

The receiving unit 901 is further configured to receive a downlink packet that is sent by a content provider server/service provider server according to the service request message.

The sending unit 903 is configured to send the downlink packet to a switch according to service flow information of the downlink packet and the corresponding service flow control policy information, so that the switch forwards the downlink packet to a corresponding network element for service processing.

The sending unit 903 is specifically configured to obtain service chain identification information, and send the downlink packet that includes the service chain identification information to the switch.

Specifically, processing of the service chain identification information is the same as processing in step 612, and is not elaborated herein any further.

After receiving the downlink packet, the switch may forward, according to the flow forwarding policy information delivered by the controller, the received packet to the corresponding network element for service processing. When a user accesses a service provided by a third-party content provider server/service provider server, the apparatus for controlling a service chain of a service flow provided in this embodiment of the present invention enables a flow classifier to send a downlink packet to a switch according to service flow information of a downlink packet provided by a content provider/service provider and corresponding service flow control policy information, and the switch performs corresponding processing on the packet and then forwards the packet to UE, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 10:
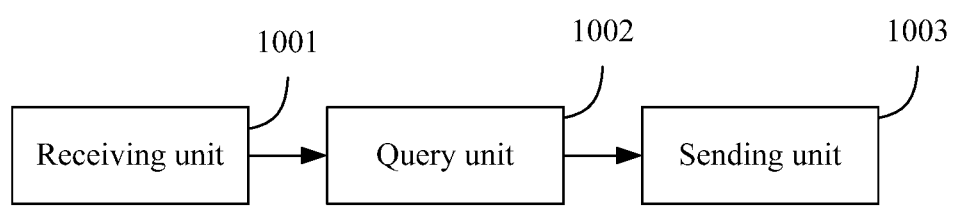
FIG. 10 is a schematic diagram of another apparatus for controlling a service chain of a service flow according to an embodiment of the present invention.

Correspondingly, an embodiment of the present invention further provides an apparatus for controlling a service chain of a service flow. FIG. 10 is a schematic diagram of another apparatus for controlling a service chain of a service flow according to an embodiment of the present invention. The apparatus may be a flow classifier. As shown in the diagram, this embodiment includes the following units: a receiving unit 1001, a query unit 1002, and a sending unit 1003.

The receiving unit 1001 is configured to receive a downlink packet sent by a content provider server/service provider server.

From the downlink packet, the flow classifier may obtain service flow information of a service flow corresponding to the downlink packet, where the service flow information includes quintuple information, that is, a source IP address, a source port, a destination IP address, a destination port, and a transport layer protocol number, and further includes service type information of a service requested in the service request message, and content provider server/service provider server identification information or content provider/service provider identification information.

The query unit 1002 is configured to acquire, according to service flow information of the downlink packet, service flow control policy information corresponding to the downlink packet and sent by a PCRF, where the service flow control policy information is constructed by the PCRF based on service chain control information sent by a service chain management system.

Locally stored service flow control policy information is delivered by the PCRF to the flow classifier after receiving the service flow control information delivered by the service chain management system, that is, second service flow control policy information. The flow classifier may query and obtain corresponding service flow control policy information according to the service flow information of the downlink packet.

The sending unit 1003 is configured to send, according to the service flow control policy information corresponding to the downlink packet, the downlink packet to a switch for processing.

The sending unit 1003 is specifically configured to obtain service chain identification information, and send the downlink packet that includes the service chain identification information to the switch.

Processing of the service chain identification information encapsulated in a packet header is the same as processing in step 612, and is not elaborated herein any further.

After receiving the downlink packet, the switch may forward, according to flow forwarding policy information delivered by a controller, the received packet to a corresponding network element for service processing.

The flow forwarding policy information includes the service chain identification information, and a forwarding table corresponding to a service chain; or service flow information corresponding to a service chain, and a forwarding table corresponding to the service chain, where the forwarding table includes the service chain sequence information.

When a user accesses a service provided by a third-party content provider server/service provider server, the apparatus for controlling a service chain of a service flow provided in this embodiment of the present invention enables a flow classifier to send a downlink packet to a switch according to service flow information of a downlink packet provided by a content provider/service provider and corresponding service flow control policy information, and the switch performs corresponding processing on the packet and then forwards the packet to UE, thereby implementing service chain control on a per content provider/service provider basis.

According to the technical solution of the present invention, a value-added service of a mobile operator can be opened to the third-party content provider server/service provider server, thereby implementing monetary processing on value-added services such as service processing and increasing incomes of the mobile operator.

Figure 11:
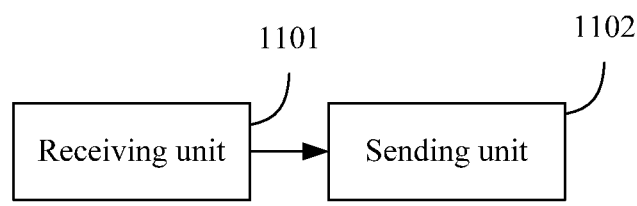
FIG. 11 is a schematic diagram of another apparatus for controlling a service chain of a service flow according to an embodiment of the present invention.

Correspondingly, an embodiment of the present invention further provides an apparatus for controlling a service chain of a service flow. FIG. 11 is a schematic diagram of another apparatus for controlling a service chain of a service flow according to an embodiment of the present invention. The apparatus may be a controller or a PCRF entity. As shown in the diagram, the apparatus includes the following units: a receiving unit 1101 and a sending unit 1102.

The receiving unit 1101 is configured to receive service chain control information sent by a service chain management system.

The service chain control information includes: service chain sequence information, and service chain identification information; or service chain sequence information, and service flow information corresponding to a service chain.

The sending unit 1102 is configured to send flow forwarding policy information to a switch based on the service chain control information, so that the switch forwards, according to a service chain corresponding to the packet and according to the flow forwarding policy information, a received packet to a corresponding network element for service processing.

The flow forwarding policy information includes a service chain identifier, and a forwarding table corresponding to the service chain; or service flow information corresponding to the service chain, and a forwarding table corresponding to the service chain, where the forwarding table includes the service chain sequence information.

In practical application, when receiving a packet of a corresponding content provider/service provider, the switch may forward, according to a flow forwarding policy, the packet to a corresponding network element for corresponding service processing, and send the processed packet to a receive end such as UE.

Preferably, the sending unit provided in this embodiment of the present invention is further configured to send first service flow control policy information to a flow classifier based on the service chain control information when receiving service flow information sent by the flow classifier.

The sending unit provided in this embodiment of the present invention is further configured to send second service flow control policy information to a flow classifier based on the service chain control information.

In practical application, the controller may directly send the second service flow control policy information to the flow classifier after receiving service flow control information of the service chain management system, and may also send the first service flow control policy information to the flow classifier after receiving service flow information corresponding to a service request message sent by the flow classifier. After receiving a service request message related to the service flow or a service downlink packet delivered by the content provider/service provider in response to the service request, the flow classifier may directly query and obtain the corresponding service flow control policy information locally, and send the packet to the next-hop routing node according to route information of next service processing in the service flow control policy information.

In this way, this embodiment of the present invention enables a switch to process a service according to a service chain corresponding to a content provider server/service provider server when a user accesses the service provided by this third-party content provider server/service provider server, and implements service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 12:
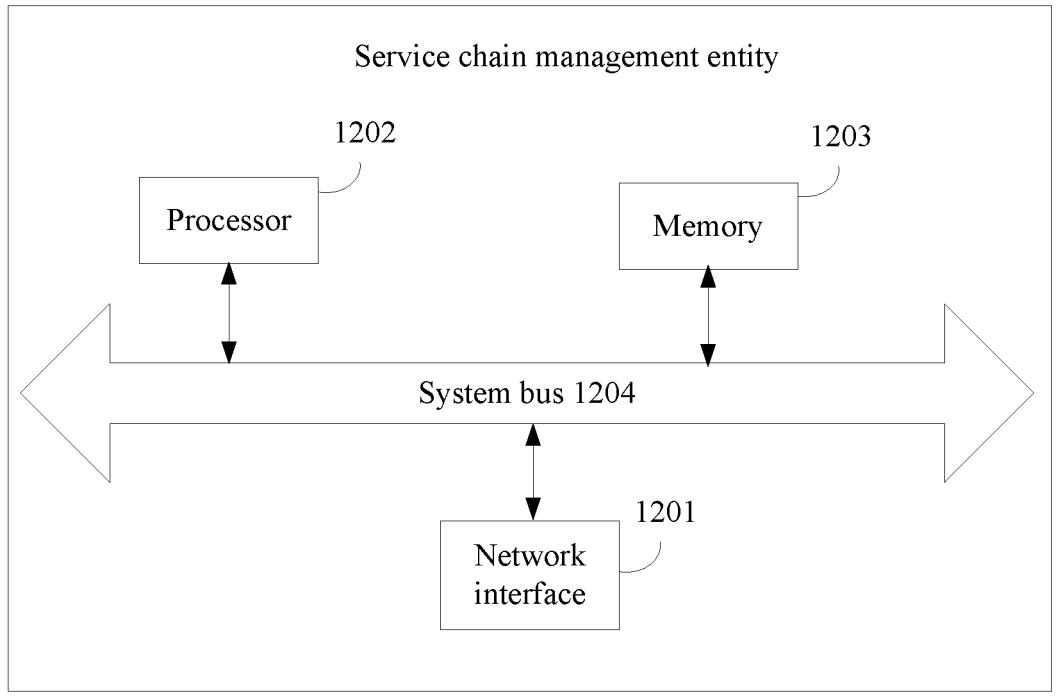
FIG. 12 is a schematic diagram of a service chain management entity according to an embodiment of the present invention.

Correspondingly, an embodiment of the present invention further provides a service chain management entity. FIG. 12 is a schematic diagram of a service chain management entity according to an embodiment of the present invention. As shown in the diagram, the entity includes a network interface 1201, a processor 1202, and a memory 1203. A system bus 1204 is configured to connect the network interface 1201, the processor 1202, and the memory 1203, and is configured to carry data transmitted between devices.

The network interface 1201 is configured to communicate with other network entities.

A software program and a device driver program exist in the memory 1203. The processor 1202 may load the software program in the memory 1203, and according to the software program, enable each device to execute a corresponding function. The device driver program may be an interface driver program.

In the service chain management entity provided in this embodiment of the present invention, the processor 1202 loads the software program in the memory 1203, and executes the following instructions according to the software program:

receiving, by a service chain management system, a service processing customization request message sent by a content provider server/service provider server;

generating, according to a service processing customization condition carried in the service processing customization request message, service chain information of a service flow corresponding to the content provider server/service provider server; and constructing, based on the service chain information, service chain control information corresponding to a service chain, so that a controller acquires the service chain control information and sends flow forwarding policy information corresponding to the service chain to a switch based on the service chain control information, so that the switch processes, according to the flow forwarding policy information, a received service flow corresponding to the content provider server/service provider server.

The service chain control information includes: service chain sequence information, and service chain identification information; or service chain sequence information, and service flow information corresponding to the service chain.

Further, the processor 1202 may further execute the following instruction after accessing the software program in the memory: constructing service flow control information according to the service chain information, and sending the service flow control information to a policy and charging rule function entity PCRF, so that the PCRF sends first service flow control policy information to a flow classifier when receiving service flow information sent by the flow classifier, so that the flow classifier forwards, according to the first service flow control policy information, the received service flow corresponding to the content provider server/service provider server to the switch for processing.

The service flow control information includes: service flow information corresponding to the service chain, and route information of next service processing; or service flow information corresponding to the service chain, route information of next service processing, and service chain identification information.

Further, the processor 1202 may further execute the following instruction after accessing the software program in the memory: constructing service flow control information according to the service chain information, and sending the service flow control information to a PCRF, so that the PCRF sends second service flow control policy information to a flow classifier, so that the flow classifier forwards, according to the second service flow control policy information, the received service flow corresponding to the content provider server/service provider server to the switch for processing.

When a user uses a Gi local area network to access service content provided by a content provider server/service provider server, a service chain management entity of a service flow provided in this embodiment of the present invention enables network elements such as a controller and a switch to perform corresponding processing on the service flow according to a service chain of a content provider/service provider, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 13:
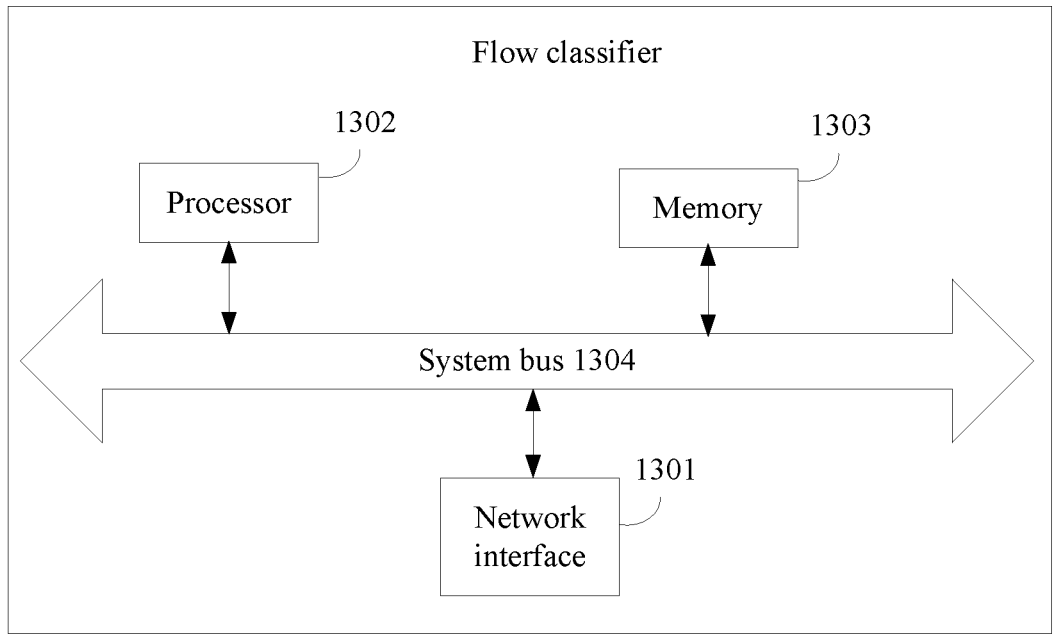
FIG. 13 is a schematic diagram of a flow classifier according to an embodiment of the present invention.

Correspondingly, an embodiment of the present invention further provides a flow classifier. FIG. 13 is a schematic diagram of a flow classifier according to an embodiment of the present invention. As shown in the diagram, the flow classifier includes a network interface 1301, a processor 1302, and a memory 1303. A system bus 1304 is configured to connect the network interface 1301, the processor 1302, and the memory 1303, and is configured to carry data transmitted between devices.

The network interface 1301 is configured to communicate with other network entities.

A software program and a device driver program exist in the memory 1303. The processor 1302 may load the software program in the memory 1303, and according to the software program, enable each device to execute a corresponding function. The device driver program may be an interface driver program.

In a service chain management entity provided in this embodiment of the present invention, the processor 1302 loads the software program in the memory 1303, and executes the following instructions according to the software program:

receiving a service request message sent by user equipment UE, where the service request message carries service flow information of a service flow corresponding to the service request message;

acquiring, according to the service flow information of the service flow corresponding to the service request message, service flow control policy information corresponding to service request information and sent by a PCRF, where the service flow control policy information is constructed by the PCRF based on service chain control information sent by a service chain management system;

receiving a downlink packet that is sent by a content provider server/service provider server according to the service request message; and sending the downlink packet to a switch according to service flow information of the downlink packet and the service flow control policy information, so that the switch performs service processing according to flow forwarding policy information delivered by a controller.

The service flow information of the service flow corresponding to the service request message includes: quintuple information, service type information corresponding to the service flow, and content provider server/service provider server identification information or content provider/service provider identification information.

The service flow control policy information includes first service flow control policy information.

Further, a process executed by the processor 1302 to send the downlink packet to the switch according to the service flow information of the downlink packet and the corresponding service flow control policy information, so that the switch forwards the downlink packet to a corresponding network element for service processing is specifically: obtaining service chain identification information, encapsulating the service chain identification information into a packet header, and sending the encapsulated downlink packet to the switch.

Processing of the service chain identification information is the same as processing in step 612, and is not elaborated herein any further.

When a user uses a Gi local area network to access service content provided by a content provider server/service provider server, a flow classifier provided in this embodiment of the present invention enables network elements such as a controller and a switch to perform corresponding processing on a service flow according to a service chain of a content provider/service provider, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 14:
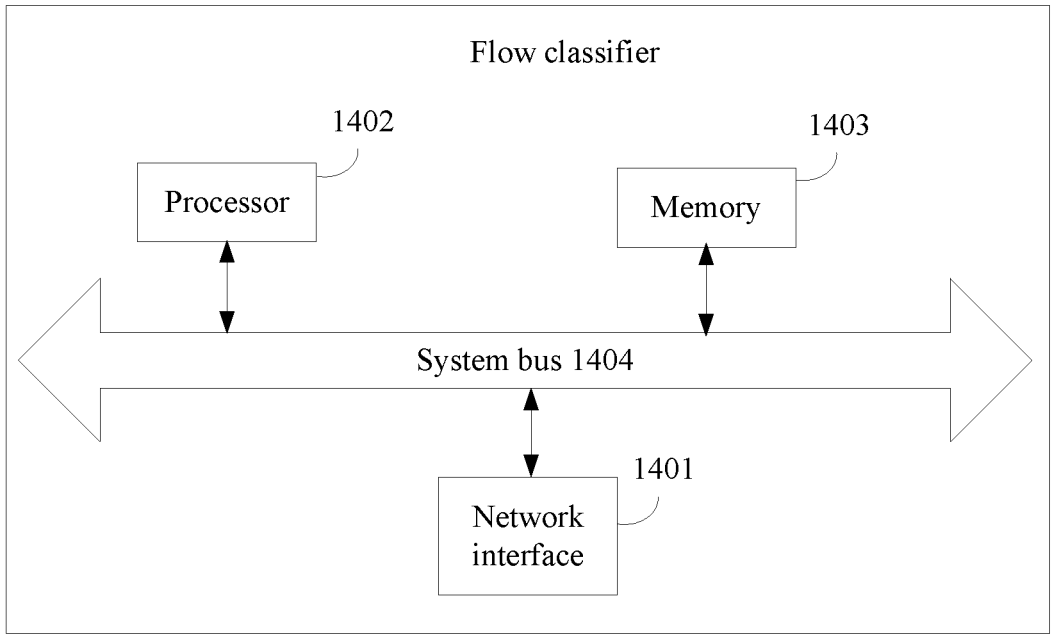
FIG. 14 is a schematic diagram of another flow classifier according to an embodiment of the present invention.

An embodiment of the present invention further provides a flow classifier. FIG. 14 is a schematic diagram of a flow classifier according to an embodiment of the present invention. As shown in the diagram, the flow classifier includes a network interface 1401, a processor 1402, and a memory 1403. A system bus 1404 is configured to connect the network interface 1401, the processor 1402, and the memory 1403, and is configured to carry data transmitted between devices.

The network interface 1401 is configured to communicate with other network entities.

A software program and a device driver program exist in the memory 1403. The processor 1402 may load the software program in the memory 1403, and according to the software program, enable each device to execute a corresponding function. The device driver program may be an interface driver program.

In a service chain management entity provided in this embodiment of the present invention, the processor 1402 loads the software program in the memory 1403, and executes the following instructions according to the software program:

receiving a downlink packet sent by a content provider server/service provider server;

acquiring, according to service flow information of the downlink packet, service flow control policy information corresponding to the downlink packet and sent by a PCRF, where the service flow control policy information is constructed by the PCRF based on service chain control information sent by a service chain management system; and sending, according to the service flow control policy information corresponding to the downlink packet, the downlink packet to a switch for processing.

The service flow control policy information includes second service flow control policy information.

Further, the sending, by the processor 1402 according to the service flow control policy information corresponding to the downlink packet, the downlink packet to a switch for processing specifically includes: obtaining service chain identification information, and sending the downlink packet that includes the service chain identification information to the switch.

Processing of the service chain identification information is the same as processing in step 612, and is not elaborated herein any further.

When a user uses a Gi local area network to access service content provided by a content provider server/service provider server, a service chain management entity of a service flow in this embodiment of the present invention enables network elements such as a controller and a switch to perform corresponding processing on the service flow according to a service chain of a content provider/service provider, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

Figure 15:
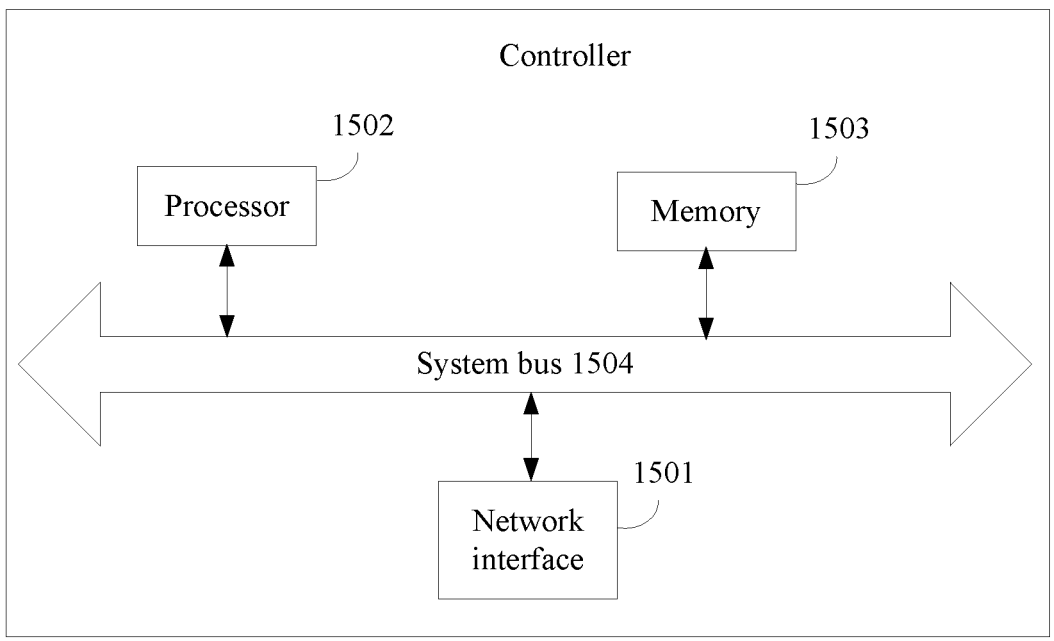
FIG. 15 is a schematic diagram of a controller according to an embodiment of the present invention.

Correspondingly, an embodiment of the present invention further provides a controller. FIG. 15 is a schematic diagram of a controller according to an embodiment of the present invention. As shown in the diagram, the flow classifier includes a network interface 1501, a processor 1502, and a memory 1503. A system bus 1504 is configured to connect the network interface 1501, the processor 1502, and the memory 1503, and is configured to carry data transmitted between devices.

The network interface 1501 is configured to communicate with other network entities.

A software program and a device driver program exist in the memory 1503. The processor 1502 may load the software program in the memory 1503, and according to the software program, enable each device to execute a corresponding function. The device driver program may be an interface driver program.

In a service chain management entity provided in this embodiment of the present invention, the processor 1502 loads the software program in the memory 1503, and executes the following instructions according to the software program:

receiving service chain control information sent by a service chain management system, where the service chain control information includes: service chain sequence information and service chain identification information; or service chain sequence information and service flow information corresponding to a service chain; and sending flow forwarding policy information to a switch based on the service chain control information, so that the switch performs service processing on a received packet according to a service chain corresponding to the packet and according to the flow forwarding policy information.

The service chain control information includes: service chain sequence information, and service chain identification information; or service chain sequence information, and service flow information corresponding to the service chain.

Further, the processor 1502 may further execute the following instruction:

sending first service flow control policy information to a flow classifier based on the service chain control information when receiving service flow information sent by the flow classifier.

Further, the processor 1502 may further execute the following instruction: sending second service flow control policy information to the flow classifier based on the service chain control information.

When a user uses a Gi local area network to access service content provided by a content provider server/service provider server, the controller provided in this embodiment of the present invention enables network elements such as a controller and a switch to perform corresponding processing on a service flow according to a service chain of a content provider/service provider, thereby implementing service chain control on a per content provider/service provider basis. According to the technical solution of the present invention, a value-added service of a mobile operator can be opened to the third-party content provider server/service provider server, thereby implementing monetary processing on value-added services such as service processing and increasing incomes of the mobile operator.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method, comprising:
receiving, by a flow classifier, a downlink packet sent by a content provider server/service provider server (CPS/SPS);
acquiring, by the flow classifier from a policy and charging rule function entity (PCRF), and according to service flow information of the downlink packet, service flow control policy information corresponding to the downlink packet, the service flow control policy information is being in accordance with service chain control information sent by a service chain management system, and corresponding to a service processing customization request message from the CPS/SPS; and
sending, by the flow classifier according to the service flow control policy information corresponding to the downlink packet, the downlink packet to a switch.

2. The method according to claim 1, wherein the service flow control policy information comprises:
CPS/SPS identification information, and route information of next service processing; or
the CPS/SPS identification information, the route information of next service processing, and service chain identification information; or
the CPS/SPS identification information, a service type corresponding to a service flow, and the route information of next service processing; or the CPS/SPS identification information, the service type corresponding to the service flow, the service chain identification information, and the route information of next service processing; or content provider/service provider identification information, and the route information of next service processing; or the content provider/service provider identification information, the route information of next service processing, and the service chain identification information; or the content provider/service provider identification information, the service type corresponding to the service flow, and the route information of next service processing; or the content provider/service provider identification information, the service type corresponding to the service flow, the route information of next service processing, and the service chain identification information.

3. The method according to claim 1, wherein sending the downlink packet comprises:

obtaining, by the flow classifier, service chain identification information;

sending the downlink packet that comprises the service chain identification information to the switch; and wherein obtaining the service chain identification information comprises:

obtaining, in response to determining that quintuple information of the downlink packet matches quintuple information comprised by the service flow control policy information, the service chain identification information from the service flow control policy information; or obtaining, in response to determining that quintuple information and a service type of the downlink packet match the quintuple information and service type comprised by service flow control policy information, the service chain identification information from the service flow control policy information; or obtaining, in response to determining that content provider/service provider identification information of the downlink packet matches content Provider/service provider identification information comprised by the service flow control policy information, the service chain identification information from the service flow control policy information; or obtaining, in response to determining that the content provider/service provider identification information and the service type of the downlink packet match the content provider/service provider identification information and the service type comprised by service flow control policy information, the service chain identification information from the service flow control policy information.

4. A method, comprising:

receiving, by a flow classifier from user equipment (UE), a service request message carrying first service flow information of a service flow;

acquiring, by the flow classifier from a policy and charging rule function entity (PCRF), service flow control policy information corresponding to the first service flow information, the service flow control policy information being in accordance with service chain control information sent by a service chain management system, and corresponding to a service processing customization request message from a content provider server/service provider server (CPS/SPS);

receiving, by the flow classifier, a downlink packet that is sent by the CPS/SPS according to the service request message; and sending, by the flow classifier, the downlink packet to a switch according to service flow information of the downlink packet and the service flow control policy information, causing the switch to perform service processing of the downlink packet according to flow forwarding policy information delivered by a controller.

5. The method according to claim 4, further comprising:

receiving, by the service chain management system from the CPS/SPS, the service processing customization request message carrying service processing customization information;

generating, by the service chain management system according to the service processing customization information, service chain information of the service flow corresponding to the CPS/SPS; and constructing, by the service chain management system based on the service chain information, the service chain control information corresponding to a service chain, causing the controller to acquire the service chain control information and to send the flow forwarding policy information corresponding to the service chain to the switch based on the service chain control information, and causing the switch to process, according to the flow forwarding policy information, a received service flow corresponding to the CPS/SPS.

6. The method according to claim 5, wherein the service processing customization information comprises:

CPS/SPS identification information; or content provider/service provider identification information and a service processing type corresponding to the service flow provided by the CPS/SPS; or the CPS/SPS identification information and a service type corresponding to the CPS/SPS; or the content provider/service provider identification information, the service processing type corresponding to the service flow provided by the CPS/SPS, and the service type corresponding to the CPS/SPS.

7. The method according to claim 5, wherein:

the service chain information comprises: service chain sequence information, and service flow information corresponding to the service chain; or the service chain sequence information, the service flow information corresponding to the service chain, and service chain identification information; and the service chain control information comprises: the service chain sequence information and the service chain identification information; or the service chain sequence information and the service flow information corresponding to the service chain.

8. The method according to claim 5, further comprising:

constructing, by the service chain management system, service flow control information according to the service chain information; and sending the service flow control information to the PCRF, causing the PCRF to send second service flow control policy information to the flow classifier when receiving service flow information sent by the flow classifier, causing the flow classifier to forward, according to the second service flow control policy information, the received service flow corresponding to the CPS/SPS to the switch for processing.

9. The method according to claim 4, wherein the first service flow information comprises quintuple information, service type information corresponding to the service flow, and CPS/SPS identification information or content provider/service provider identification information.

10. The method according to claim 4, wherein the service flow control policy information comprises:
the first service flow information and route information of next service processing; or
the first service flow information, the route information of next service processing, and service chain identification information.

11. The method according to claim 4, wherein sending the downlink packet comprises:
obtaining, by the flow classifier, service chain identification information;
sending the downlink packet that comprises the service chain identification information to the switch; and
wherein obtaining the service chain identification information comprises:
obtaining, in response to determining that quintuple information of the downlink packet matches quintuple information comprised by the service flow control policy information, the service chain identification information from the service flow control policy information; or
obtaining, in response to determining that the quintuple information and a service type of the downlink packet match the quintuple information and service type comprised by the service flow control policy information, the service chain identification information from the service flow control policy information; or
obtaining, in response to determining that content provider/service provider identification information of the downlink packet matches content provider/service provider identification information comprised by the service flow control policy information, the service chain identification information from the service flow control policy information; or
obtaining, in response to determining that the content provider/service provider identification information and the service type of the downlink packet match the content provider/service provider identification information and the service type comprised by the service flow control policy information, the service chain identification information from the service flow control policy information.

12. The method according to claim 4, wherein:
the service chain control information comprises: service chain sequence information and service chain identification information; or the service chain sequence information and the first service flow information; and
the flow forwarding policy information is based on the service chain control information.

13. The method according to claim 12, wherein:
the service chain sequence information comprises a service processing sequence corresponding to the service flow provided by the CPS/SPS, and information of network elements that execute different types of service processing indicated by the service processing sequence; and
the first service flow information comprises: CPS/SPS identification information; or CPS/SPS identification information and a service type corresponding to the service flow; or content provider/service provider identification information; or content provider/service provider identification information and the service type corresponding to the service flow.

14. The method according to claim 12, wherein:
the flow forwarding policy information comprises: a service chain identifier, and a forwarding table corresponding to the service chain; or the first service flow information, and the forwarding table corresponding to the service chain; and
the forwarding table comprises the service chain sequence information.

15. An apparatus, comprising:
a non-transitory memory storage comprising instructions; and
one or more processors in communication with the non-transitory memory storage, wherein the one or more processors execute the instructions to:
receive a downlink packet sent by a content provider server/service provider server (CPS/SPS);
acquire, from a policy and charging rule function entity (PCRF), according to service flow information of the downlink packet, service flow control policy information corresponding to the downlink packet, the service flow control policy information being in accordance with service chain control information sent by a service chain management system, and corresponding to a service processing customization request message from the CPS/SPS; and
send, according to the service flow control policy information corresponding to the downlink packet, the downlink packet to a switch.

16. The apparatus according to claim 15, wherein the service flow control policy information comprises:
CPS/SPS identification information, and route information of next service processing; or
the CPS/SPS identification information, the route information of next service processing, and service chain identification information; or
the CPS/SPS identification information, a service type corresponding to a service flow, and the route information of next service processing; or
the CPS/SPS identification information, the service type corresponding to the service flow, the service chain identification information, and the route information of next service processing; or
content provider/service provider identification information, and the route information of next service processing; or
the content provider/service provider identification information, the route information of next service processing, and the service chain identification information; or
the content provider/service provider identification information, the service type corresponding to the service flow, and the route information of next service processing; or
the content provider/service provider identification information, the service type corresponding to the service flow, the route information of next service processing, and the service chain identification information.

17. The apparatus according to claim 15, wherein the one or more processors execute further instructions to:
obtain service chain identification information;
send the downlink packet that comprises the service chain identification information to the switch; and
wherein instructions to obtain the service chain identification information comprise instructions to:
obtain, in response to determining that a source address of the downlink packet matches a CPS/SPS identification information comprised by the service flow control policy information, the service chain identification information from the service flow control policy information; or obtain, in response to determining that the source address and a service type of the downlink packet match the CPS/SPS identification information and service type comprised by the service flow control policy information, the service chain identification information from the service flow control policy information; or obtain, in response to determining that content provider/service provider identification information of the downlink packet matches content provider/service provider identification information comprised by the service flow control policy information, the service chain identification information from the service flow control policy information; or obtain, in response to determining that the content provider/service provider identification information and the service type of the downlink packet match the content provider/service provider identification information and the service type comprised by the service flow control policy information, the service chain identification information from the service flow control policy information.

18. An apparatus, comprising:
a non-transitory memory storage comprising instructions; and
one or more processors in communication with the non-transitory memory storage, wherein the one or more processors execute the instructions to:
    receive, from user equipment (UE), a service request message carrying first service flow information of a service flow;
    acquire, from a policy and charging rule function entity (PCRF), service flow control policy information corresponding to the first service flow information, the service flow control policy information being in accordance with service chain control information sent by a service chain management system, and corresponding to a service processing customization request message from a content provider server/service provider server (CPS/SPS);
    receive a downlink packet that is sent by the CPS/SPS according to the service request message; and
    send the downlink packet to a switch according to service flow information of the downlink packet and the corresponding service flow control policy information, causing the switch to forward the downlink packet to a corresponding network element for service processing.

19. A system, comprising:
the apparatus according to claim 18; and
a service chain management system configured to:
    receive, from the CPS/SPS, the service processing customization request message carrying service processing customization information;
    generate, according to the service processing customization information, service chain information of the service flow corresponding to the CPS/SPS; and
    construct, based on the service chain information, the service chain control information corresponding to a service chain, causing a controller to acquire the service chain control information and to send flow forwarding policy information corresponding to the service chain to the switch based on the service chain control information, and causing the switch to process, according to the flow forwarding policy information, a received service flow corresponding to the CPS/SPS.

20. The system according to claim 19, wherein the service processing customization information comprises:
    CPS/SPS identification information; or
    content provider/service provider identification information and a service processing type corresponding to the service flow provided by the CPS/SPS; or
    the CPS/SPS identification information and a service type corresponding to the CPS/SPS; or
    the content provider/service provider identification information, the service processing type corresponding to the service flow provided by the CPS/SPS, and the service type corresponding to the CPS/SPS.

21. The system according to claim 19, wherein the service chain information comprises:
    service chain sequence information, and service flow information corresponding to the service chain; or
    the service chain sequence information, the service flow information corresponding to the service chain, and service chain identification information.

22. The system according to claim 19, wherein the service chain management system is further configured to:
    construct service flow control information according to the service chain information; and
    send the service flow control information to the PCRF, causing the PCRF to send second service flow control policy information to the apparatus when receiving service flow information sent by the apparatus, causing the apparatus to forward, according to the second service flow control policy information, the received service flow corresponding to the CPS/SPS to the switch.

23. The system according to claim 19, wherein the service chain management system is further configured to:
    construct service flow control information according to the service chain information; and
    send the service flow control information to the PCRF, causing the PCRF to send third service flow control policy information to the apparatus, causing the apparatus to forward, according to the third service flow control policy information, the received service flow corresponding to the CPS/SPS to the switch.

24. The apparatus according to claim 18, wherein the first service flow information comprises quintuple information, service type information corresponding to the service flow, and CPS/SPS identification information or content provider/service provider identification information.

25. The apparatus according to claim 18, wherein the service flow control policy information comprises:
    the first service flow information, and route information of next service processing; or
    the first service flow information, the route information of next service processing, and service chain identification information.

26. The apparatus according to claim 18, wherein the one or more processors execute further instructions to:
    obtain service chain identification information;
    send the downlink packet that comprises the service chain identification information to the switch; and
    wherein instructions to obtain the service chain identification information comprise instructions to:
        obtain, in response to determining that quintuple information of the downlink packet matches quintuple information comprised by the service flow control policy information, the service chain identification information from the service flow control policy information; or obtain, in response to determining that the quintuple information and a service type of the downlink packet match the quintuple information and service type comprised by the service flow control policy information, the service chain identification information from the service flow control policy information; or obtain, in response to determining that content provider/service provider identification information of the downlink packet matches content provider/service provider identification information comprised by the service flow control policy information, the service chain identification information from the service flow control policy information; or obtain, in response to determining that the content provider/service provider identification information and the service type of the downlink packet match the content provider/service provider identification information and the service type comprised by the service flow control policy information, the service chain identification information from the service flow control policy information.

27. A system, comprising:
the apparatus according to claim 18; and
a network device communicatively coupled to the apparatus and to the switch, and configured to:
receive the service chain control information sent by the service chain management system, wherein the service chain control information comprises: service chain sequence information and service chain identification information; or the service chain sequence information and the first service flow information; and send flow forwarding policy information to the switch based on the service chain control information, causing the switch to perform service processing on a received packet according to a service chain corresponding to the received packet and according to the flow forwarding policy information; and wherein the network device is comprised by the PCRF or by a controller.

28. The system according to claim 27, wherein the service chain sequence information comprises a service processing sequence corresponding to the service flow provided by the CPS/SPS, and information of network elements that execute different types of service processing indicated by the service processing sequence.

29. The system according to claim 27, wherein the first service flow information comprises: CPS/SPS identification information; or the CPS/SPS identification information and a service type corresponding to the service flow; or content provider/service provider identification information; or content provider/service provider identification information and the service type corresponding to the service flow.

* * * * *